(12) United States Patent
Moeller et al.

(10) Patent No.: US 11,465,587 B2
(45) Date of Patent: Oct. 11, 2022

(54) VEHICULAR KEY FOB DEVICE

(71) Applicant: KEEP TECHNOLOGIES, INC., Atlanta, GA (US)

(72) Inventors: David Moeller, Atlanta, GA (US); Jonathan Manuzak, Atlanta, GA (US); Ian Mathews, Atlanta, GA (US); Rahul Maran, Atlanta, GA (US); Nick Allison, Atlanta, GA (US)

(73) Assignee: KEEP TECHNOLOGIES, INC., Atlanta, GA (US)

( * ) Notice: Subject to any disclaimer, the term of this patent is extended or adjusted under 35 U.S.C. 154(b) by 0 days.

(21) Appl. No.: 17/584,232

(22) Filed: Jan. 25, 2022

(65) Prior Publication Data

US 2022/0169207 A1 Jun. 2, 2022

Related U.S. Application Data

(63) Continuation-in-part of application No. 17/157,369, filed on Jan. 25, 2021, which is a continuation of
(Continued)

(51) Int. Cl.
*B60R 11/00* (2006.01)
*B60R 25/34* (2013.01)
(Continued)

(52) U.S. Cl.
CPC ............... *B60R 25/31* (2013.01); *B60R 1/00* (2013.01); *B60R 11/00* (2013.01); *B60R 25/04* (2013.01); *B60R 25/102* (2013.01); *B60R 25/1003* (2013.01); *B60R 25/1004* (2013.01); *B60R 25/1009* (2013.01); *B60R 25/1018* (2013.01); *B60R 25/1025* (2013.01); *B60R 25/24* (2013.01); *B60R 25/245* (2013.01); *B60R 25/25* (2013.01); *B60R 25/305* (2013.01);
(Continued)

(58) Field of Classification Search
CPC ......... B60R 25/31; B60R 11/00; B60R 25/34; B60R 2011/0007; B60R 2300/8006; B60R 2300/8073; B60R 2325/20; G01B 17/00; G01P 13/00; G07C 2009/00539; G07C 2009/00984
USPC ....................................................... 701/33.2
See application file for complete search history.

(56) References Cited

U.S. PATENT DOCUMENTS 6,424,056 B1 * 7/2002 Irvin ................... B60R 25/2009
307/10.1
6,816,089 B2 * 11/2004 Flick ........................ G08G 1/20
340/988

(Continued)

*Primary Examiner* — Jaime Figueroa
(74) *Attorney, Agent, or Firm* — Morris, Manning & Martin, LLP; Daniel E. Sineway, Esq.; Adam J. Thompson, Esq.

(57) ABSTRACT

A sensing device can include an accelerometer, a transceiver, and a computing device in communication with the accelerometer and transceiver. The computing device can transmit a first set of signals at a first power level to a remote device. The computing device can determine, via the accelerometer, a movement of the sensing device. The computing device can increase a power level for transmission from the first power level to a second power level in response to the movement. The computing device can transmit future signals at the second power level to the remote device.

20 Claims, 6 Drawing Sheets

Related U.S. Application Data application No. 16/988,447, filed on Aug. 7, 2020, now Pat. No. 10,899,317.

(60) Provisional application No. 62/883,875, filed on Aug. 7, 2019.

(51) Int. Cl.

| | |
|---|---|
| *B60R 25/31* | (2013.01) |
| *B60R 25/30* | (2013.01) |
| *B60R 25/25* | (2013.01) |
| *B60R 25/10* | (2013.01) |
| *B60R 25/102* | (2013.01) |
| *G01B 17/00* | (2006.01) |
| *G01J 5/00* | (2022.01) |
| *G01P 13/00* | (2006.01) |
| *B60R 25/24* | (2013.01) |
| *G06F 3/01* | (2006.01) |
| *G06F 3/16* | (2006.01) |
| *G06F 8/65* | (2018.01) |
| *G06F 21/57* | (2013.01) |
| *G06Q 20/10* | (2012.01) |
| *G06Q 20/32* | (2012.01) |
| *G06Q 20/40* | (2012.01) |
| *G06Q 30/06* | (2012.01) |
| *H04L 9/06* | (2006.01) |
| *H04L 9/08* | (2006.01) |
| *H04L 9/32* | (2006.01) |
| *H04W 4/021* | (2018.01) |
| *B60R 25/32* | (2013.01) |
| *B60R 25/33* | (2013.01) |
| *G01V 11/00* | (2006.01) |
| *G06T 7/174* | (2017.01) |
| *B60R 25/04* | (2013.01) |
| *G07C 9/00* | (2020.01) |
| *B60R 25/40* | (2013.01) |
| *G08B 21/18* | (2006.01) |
| *B60R 1/00* | (2022.01) |
| *G06V 20/59* | (2022.01) |
| *G06V 40/16* | (2022.01) |
| *H04L 51/224* | (2022.01) |

(52) U.S. Cl.

CPC ............ *B60R 25/307* (2013.01); *B60R 25/32* (2013.01); *B60R 25/33* (2013.01); *B60R 25/34* (2013.01); *B60R 25/403* (2013.01); *B60R 25/406* (2013.01); *G01B 17/00* (2013.01); *G01J 5/0025* (2013.01); *G01P 13/00* (2013.01); *G01V 11/002* (2013.01); *G06F 3/017* (2013.01); *G06F 3/167* (2013.01); *G06F 8/65* (2013.01); *G06F 21/572* (2013.01); *G06Q 20/102* (2013.01); *G06Q 20/3278* (2013.01); *G06Q 20/40145* (2013.01); *G06Q 30/0635* (2013.01); *G06T 7/174* (2017.01); *G06V 20/59* (2022.01); *G06V 40/172* (2022.01); *G07C 9/00182* (2013.01); *G08B 21/182* (2013.01); *H04L 9/0643* (2013.01); *H04L 9/0869* (2013.01); *H04L 9/3231* (2013.01); *H04L 51/224* (2022.05); *H04W 4/021* (2013.01); *B60R 2011/0007* (2013.01); *B60R 2025/0405* (2013.01); *B60R 2025/1013* (2013.01); *B60R 2300/103* (2013.01); *B60R 2300/8006* (2013.01); *B60R 2300/8073* (2013.01); *B60R 2325/10* (2013.01); *B60R 2325/101* (2013.01); *B60R 2325/103* (2013.01); *B60R 2325/20* (2013.01); *B60R 2325/205* (2013.01); *G06T 2207/10016* (2013.01); *G07C 2009/0019* (2013.01); *G07C 2009/00396* (2013.01); *G07C 2009/00539* (2013.01); *G07C 2009/00769* (2013.01); *G07C 2009/00984* (2013.01); *H04L 2209/84* (2013.01)

(56) References Cited

U.S. PATENT DOCUMENTS

| | | | | |
|---|---|---|---|---|
| 7,202,775 | B2 * | 4/2007 | Yezersky | G08C 17/02 340/426.14 |
| 7,474,208 | B1 * | 1/2009 | Klein | G08B 21/24 342/146 |
| 9,380,540 | B1 * | 6/2016 | Hermann | G07C 9/00309 |
| 9,794,753 | B1 * | 10/2017 | Stitt | G06F 21/31 |
| 9,963,107 | B2 * | 5/2018 | Murar | B60Q 1/247 |
| 11,217,048 | B2 * | 1/2022 | Stitt | H04L 47/283 |
| 2002/0101366 | A1 * | 8/2002 | Flick | B60R 25/33 340/988 |
| 2007/0200672 | A1 * | 8/2007 | McBride | B60R 25/245 340/5.72 |
| 2009/0243796 | A1 * | 10/2009 | Tieman | B60R 25/406 340/5.72 |
| 2010/0075656 | A1 * | 3/2010 | Howarter | B60R 25/241 340/5.2 |
| 2010/0185341 | A1 * | 7/2010 | Wilson | B60R 25/2045 701/1 |
| 2010/0188219 | A1 * | 7/2010 | Todd | G08B 21/023 340/568.1 |
| 2011/0021234 | A1 * | 1/2011 | Tibbitts | H04W 4/02 455/517 |
| 2011/0057817 | A1 * | 3/2011 | Proefke | G01S 13/74 340/989 |
| 2015/0068069 | A1 * | 3/2015 | Tran | A43B 3/34 340/693.1 |
| 2015/0258962 | A1 * | 9/2015 | Khanu | G07C 9/00309 701/2 |
| 2017/0232930 | A1 * | 8/2017 | Murar | B60Q 1/247 340/5.61 |
| 2018/0029560 | A1 * | 2/2018 | Mohaupt | B60R 25/255 |
| 2020/0180561 | A1 * | 6/2020 | Lane | G06V 40/103 |
| 2020/0219343 | A1 * | 7/2020 | Stitt | H04L 47/283 |
| 2020/0258331 | A1 * | 8/2020 | Gonring | G07C 9/28 |
| 2021/0311162 | A1 * | 10/2021 | Mai | G01S 7/415 |

* cited by examiner

VEHICULAR KEY FOB DEVICE

CROSS REFERENCE TO RELATED APPLICATIONS

This application is a continuation-in-part of U.S. patent application Ser. No. 17/157,369, filed Jan. 25, 2021 and entitled "PHYSICALLY SECURED DEVICE FOR VEHICLE INTRUSION DETECTION," which is a continuation of U.S. patent application Ser. No. 16/988,447, filed Aug. 7, 2020, entitled "PHYSICALLY SECURED DEVICE FOR VEHICLE INTRUSION DETECTION," which claims the benefit of and priority to U.S. Patent Application No. 62/883,875, filed Aug. 7, 2019, entitled "SYSTEMS, METHODS, AND APPARATUSES FOR AUTOMOBILE ACCESS AND INTRUSION DETECTION," which are each incorporated herein by reference in their entireties.

TECHNICAL FIELD

The present systems and processes relate generally to anti-vehicle theft systems.

BACKGROUND

Previous approaches to intrusion detection systems for vehicles generally include outdated technology, such as switches built into door locks, for detecting entry into a locked vehicle. The typical response to detecting such entry is sounding an alarm sourced from the vehicle; however, the alarm is only made known to those within a close proximity to the vehicle to hear the alarm, and is frequently not effective for alerting the vehicle owner of the intrusion. Furthermore, environmental factors (e.g., loud noises, strong winds, etc.) frequently cause false alarms, which creates confusion for automobile owners and nearby pedestrians, and also has led to insensitivity to audio-only car alarms. In addition, previous alarm systems may only be controllable onsite and, thus, a user may be unable to deactivate, activate, or monitor the alarm system remotely. Another consideration of vehicle security is providing the level of security that is appropriate for a current situation. For example, vehicle security requirements may be less strict when a vehicle is parked at a secure, off street location, whereas vehicle security requirements may be greater when the vehicle is parked at a gas station pump or on an open street. Previous vehicle anti-theft systems are unable to adapt for such dynamic security needs and, therefore, often provide inappropriately low or high levels of security monitoring and response.

Therefore, there exists a long-felt but unresolved need for improved systems, methods, and apparatuses for automobile access and intrusion detection.

BRIEF SUMMARY OF THE DISCLOSURE

Briefly described, and according to one embodiment, aspects of the present disclosure generally relate to systems and processes for detecting and responding to vehicle intrusion events.

In various embodiments, the present security system includes one or more security devices configured to monitor for anomalous activities occurring in and around a vehicle. The security device can include, but is not limited to, a monitor application, one or more sensors, one or more transceivers, storage, positioning circuitry, and a locking mechanism. The locking mechanism can secure the security device to the vehicle. As further described herein, the security system can include, but is not limited to, a vehicle, one or more security devices, one or more sensors, one or more remote devices, and a computing environment.

The monitor application can be coupled to the sensor, transceiver, and positioning circuitry. In some embodiments, one or more sensors are separate from the security device and communicate with the monitor application via any suitable wired or wireless means (e.g., Bluetooth, NFC, Wi-Fi, infrared, etc.). The positioning circuitry can include any circuit, device, sensor, or system configured to receive or generate positional data corresponding to a current location of the security device or a vehicle within which the security device has been installed. In another example, the positioning circuitry is an onboard navigation system of the vehicle, such as, for example, a global positioning system (GPS). In at least one embodiment, the positioning circuitry is located separate from the security device and the monitor application communicates with the positioning circuitry via any suitable wired or wireless means. In one example, the positioning circuitry is located on a user's computing device, and the monitor application is configured to communicate with and receive positional data from the user's computing device.

The monitor application can determine the location of the security device or the vehicle via the positioning circuitry. The monitor application can analyze the location and determine an association exists between one or more points-of-interest (POIs) associated with the location. The monitor application can determine one or more predefined categories with which the POI is associated. The monitor application can adjust one or more settings of the security device and/or sensor based on the predefined category. For example, the monitor application downloads a device profile associated with the predefined category. Continuing the example, based on the device profile, the monitor application transitions the security device into an armed mode, including activating the sensor and configuring the sensor to a high power, high sensitivity mode.

The transceiver of the security device can receive transmissions from a remote device carried by the subject. The remote device can include, for example, an electronic key fob or a mobile device, such as a smartphone. The remote device can include a transceiver configured for communication with the security device. The remote device can include one or more sensors, such as, for example, an accelerometer, a proximity sensor, or positioning circuitry. The monitor application can receive and analyze signal from the remote device. The signal can include sensors readings, such as motion data from an accelerometer. The monitor application can determine that the subject is moving away from the vehicle based on analyses of signal and/or motion data from the remote device. The monitor application can transition the security device into an armed mode in response to determining that the subject is moving away (e.g., and, in some embodiments, in combination with the determination that the vehicle is at the POI).

The security device can collect data from one or more sensors. The monitor application can analyze the sensor data and, based on the analysis, detect an intrusion into the vehicle. In response to detecting the intrusion, the monitor application can perform one or more actions, such as generating an alarm at the vehicle, transmitting an alert to the mobile device, notifying emergency services, or disabling the vehicle.

According to a first aspect, a sensing device, comprising: A) at least one sensor; B) positioning circuitry; C) a transceiver; and D) a computing device in communication with the at least one sensor, the positioning circuitry, and the transceiver, the computing device being configured to: 1) determine a location of a vehicle via the positioning circuitry; 2) determine that a point of interest (POI) associated with a predefined category of POIs corresponds to the location; 3) determine, via the transceiver, that a remote device associated with a person is moving away from the vehicle based on a measurement associated with the remote device; 4) in response to determining that the location of the vehicle corresponds to the POI and that the remote device is moving away from the vehicle, enter into an armed mode; 5) detect an intrusion into the vehicle while in the armed mode based at least in part on measurements from the at least one sensor; and 6) generate an alarm in response to the intrusion.

According to a further aspect, the sensing device of the first aspect or any other aspect, wherein the computing device is further configured to: A) download a device profile associated with the predefined category of POIs; and B) modify at least one setting of the sensing device based on the device profile, wherein entering into the arm mode is based on the at least one setting.

According to a further aspect, the sensing device of the first aspect or any other aspect, wherein the computing device is further configured to: A) receive motion data associated with at least one sensor; B) determine that a pattern in the motion data meets one of a plurality of predetermined threshold patterns; and C) enter into the armed mode further based on the pattern in the motion data meeting the one of the plurality of predetermined threshold patterns.

According to a further aspect, the sensing device of the first aspect or any other aspect, wherein the at least one sensor comprises a gas door motion sensor and the pattern comprises a pattern of motion corresponding to one of: opening or closing of the gas door motion sensor.

According to a further aspect, the sensing device of the first aspect or any other aspect, further comprising a camera, wherein the alarm comprises: A) generating a notification on a mobile device associated with a user account; and B) streaming a video feed from the camera to the mobile device.

According to a further aspect, the sensing device of the first aspect or any other aspect, wherein the computing device is further configured to: A) receive a plurality of measurements from the remote device over a period of time; B) determine that the plurality of measurements decrease to be at or below a threshold value; and C) determine that the person is moving away from the vehicle in response to the plurality of measurements decreasing to be at or below the threshold value.

According to a further aspect, the sensing device of the first aspect or any other aspect, wherein the computing device is further configured to: A) receive a plurality of signals from the remote device over a period of time; B) determine that a plurality of received signal strength indicator (RSSI) values associated with the plurality of signals; C) perform a regression analysis on the plurality of received signal strength indicator over the period of time to generate a regression model; C) determine that a coefficient of correlation in the regression model meets a predefined threshold; D) determine that a time-based coefficient in the regression model is negative; and E) determine that the person is moving away from the vehicle in response to the coefficient of correlation in the regression model meeting the predefined threshold and the time-based coefficient in the regression model being negative.

According to a further aspect, the sensing device of the first aspect or any other aspect, wherein the measurement associated with the remote device comprises the plurality of signals.

According to a further aspect, the sensing device of the first aspect or any other aspect, wherein the predefined category of POIs comprises at least one of: a gas station or an electric vehicle charging station.

According to a second aspect, a sensing method, comprising: A) determining, via at least one computing device, a location of a vehicle via a positioning circuitry; B) determining, via the at least one computing device, that a point of interest (POI) is within a predetermined distance from the location; C) determining, via the at least one computing device, that a person is moving away from the vehicle based on a measurement associated with a remote device; D) in response to determining that the POI is within the predetermined distance and that the person is moving away from the vehicle, entering, via the at least one computing device, into an armed mode; E) detecting, via the at least one computing device, an intrusion into the vehicle while in the armed mode based at least in part on measurements from at least one sensor; and F) transmitting, via the at least one computing device, a message of the intrusion to a particular device associated with a user account.

According to a further aspect, the sensing method of the second aspect or any other aspect, wherein the at least one computing device comprises a data store and the data store comprises a plurality of POIs.

According to a further aspect, the sensing method of the second aspect or any other aspect, further comprising: A) receiving, via the at least one computing device, an indication that a second vehicle within the predetermined distance from the POI has reported a second intrusion; and B) in response to the indication and the at least one computing device being in the armed mode, generating, via the at least one computing device, an alarm.

According to a further aspect, the sensing method of the second aspect or any other aspect, further comprising receiving, via the at least one computing device, positioning information from the remote device, wherein determining that the person is moving away from the vehicle further based on the positioning information.

According to a further aspect, the sensing method of the second aspect or any other aspect, further comprising determining that a gas level of the vehicle has increased, wherein the armed mode is further entered based on determining that the gas level has increased.

According to a further aspect, the sensing method of the second aspect or any other aspect, wherein determining that the person is moving away from the vehicle further comprises determining a movement, via an accelerometer, of the remote device away from the vehicle.

According to a further aspect, the sensing method of the second aspect or any other aspect, wherein the accelerometer comprises a gyroscope.

According to a third aspect, a sensing system comprising: A) a transmission device comprising: 1) a first transceiver; and 2) a first computing device in communication with the first transceiver; and B) a sensing device comprising: 1) a second transceiver; and 2) a second computing device in communication with the second transceiver, the second computing device being configured to: i) determine that a point of interest (POI) associated with a predefined category of POIs corresponds to a location of the second computing device; ii) determine, via the second transceiver, that a person is moving away from a vehicle based on communications with the first computing device via the first transceiver; iii) in response to determining that the location of the vehicle corresponding to the POI and that the person is moving away from the vehicle, enter into an armed mode; iv) detect an intrusion into the vehicle while in the armed mode; and v) generate an alarm in response to the intrusion.

According to a further aspect, the sensing system of the third aspect or any other aspect, wherein the transmission device is coupled to a gas tank door.

According to a further aspect, the sensing system of the third aspect or any other aspect, wherein the second computing device is further configured to determine that the POI associated with the predefined category of POIs corresponds to the location by: A) transmitting, via a wide area network, a query comprising the location of the second computing device to a remote service; and B) receiving, via the wide area network, a list of at least one POI within a predefined distance from the location.

According to a further aspect, the sensing system of the third aspect or any other aspect, wherein the first computing device is configured to: A) transmit, at a power level and a frequency, a signal from the first transceiver; B) receive, via the first transceiver, a message from the second computing device comprising at least one setting; and C) change at least one of: the power level of transmission and the frequency of transmission of the signal based on the at least one setting.

According to a forth aspect, a sensing device, comprising: A) an accelerometer; B) a transceiver; and C) a computing device in communication with the accelerometer and the transceiver, the computing device being configured to: 1) transmit a first plurality of signals at a first power level to a remote device; 2) determine, via the accelerometer, a movement of the sensing device; 3) in response to the movement, increase a power level for transmission from the first power level to a second power level; and 4) transmit a second plurality of signals at the second power level to the remote device.

According to a further aspect, the sensing device of the fourth aspect or any other aspect, wherein the computing device is further configured to: A) determine, via the transceiver, that the sensing device has not moved relative to the remote device for a predetermined time; and B) reduce the power level for transmission based on the sensing device not moving relative to the remote device.

According to a further aspect, the sensing device of the fourth aspect or any other aspect, wherein determining that the sensing device has not moved is based on a signal strength of transmissions received by the transceiver.

According to a further aspect, the sensing device of the fourth aspect or any other aspect, wherein the computing device is further configured to: A) determine, via the accelerometer, that sensing device has not moved for a predetermined time; and B) reduce the power level for transmission based on the sensing device not moving.

According to a further aspect, the sensing device of the fourth aspect or any other aspect, wherein the computing device is further configured to: A) receive, from the remote device, a message comprising a third power level responsive to a signal strength of at least one signal of the plurality of second signals meeting or falling below a predetermined threshold value; and B) in response to the message, decrease the power level for transmission from the second power level to the third power level.

According to a further aspect, the sensing device of the fourth aspect or any other aspect, wherein the third power level is based on the signal strength of the at least one signal.

According to a further aspect, the sensing device of the fourth aspect or any other aspect, wherein the third power level is the same as the first power level.

According to a further aspect, the sensing device of the fourth aspect or any other aspect, wherein the computing device is further configured to: receive, from the remote device, a message comprising a third power level responsive to a signal strength of at least one signal of the plurality of second signals meeting or exceeding a predetermined threshold value; and in response to the message, increase the power level for transmission from the second power level to the third power level.

According to a further aspect, the sensing device of the fourth aspect or any other aspect, wherein the sensing device is a key FOB for a vehicle.

According to a fifth aspect, a method, comprising: A) transmitting, via a transceiver of a sensing device, a plurality of first signals at a first frequency to a remote device; B) determining, via an accelerometer of the sensing device, a movement of the sensing device; and C) in response to the movement of the sensing device, transmitting, via the transceiver of the sensing device, a plurality of second signals at a second frequency to the remote device.

According to a further aspect, the method of the fifth aspect or any other aspect, further comprising determining that a person is moving away from a vehicle in response to the movement of the sensing device.

According to a further aspect, the method of the fifth aspect or any other aspect, further comprising: A) receiving, via the plurality of first signals, a battery level of the remote device; and B) adjusting a value of the second frequency based on the battery level of the remote device.

According to a sixth aspect, a sensing device, comprising: A) at least one sensor; B) a transceiver; and C) a computing device in communication with the at least one sensor and the transceiver, the computing device being configured to: 1) receive a plurality of signals from a remote device over a period of time via the transceiver; 2) determine a plurality of signal strength values individually associated with a respective one of the plurality of signals; 3) determine that a subset of the plurality of signal strength values passes a predefined threshold value; and 4) in response to determining that the subset of the plurality of signal strength values passed the predefined threshold value, send instructions to the remote device to cause the remote device to generate signals at a different power level.

According to a further aspect, the sensing device of the sixth aspect or any other aspect, wherein the computing device is further configured to determine the different power level based on a battery level of the remote device.

According to a further aspect, the sensing device of the sixth aspect or any other aspect, wherein the computing device is further configured to determine that an elapsed time that the subset of the plurality of signal strength values passed the predefined threshold meets a time threshold, wherein the instructions are sent further in response to the elapsed time meeting the time threshold.

According to a further aspect, the sensing device of the sixth aspect or any other aspect, wherein the computing device is further configured to: A) perform a regression analysis on the plurality of signal strength values over the period of time to generate a regression model; B) determine that a coefficient of correlation in the regression model meets a predefined correlation threshold; C) determine that a time-based coefficient in the regression model is negative; and D) determine that a person is moving away from a vehicle in response to the coefficient of correlation in the regression model meeting the predefined correlation threshold and the time-based coefficient in the regression model being negative, wherein the instructions are sent further in response to determining the person is moving away from the vehicle and the instructions cause the remote device to generate signals at an increased power level.

According to a further aspect, the sensing device of the sixth aspect or any other aspect, wherein the computing device is further configured to: A) receive motion data associated with the remote device; B) determine that a pattern in the motion data meets one of a plurality of predetermined threshold patterns; and C) enter into an armed mode from an unarmed mode based on the pattern in the motion data meeting the one of the plurality of predetermined threshold patterns.

According to a further aspect, the sensing device of the sixth aspect or any other aspect, wherein the computing device is further configured to: A) determine that the plurality of signals decrease to be at or below a threshold value; and B) determine that a person is moving away from a vehicle in response to the plurality of signals decreasing to be at or below the threshold value.

According to a further aspect, the sensing device of the sixth aspect or any other aspect, wherein the plurality of signals comprise a plurality of measurements from at least one sensor associated with the remote device.

According to a further aspect, the sensing device of the sixth aspect or any other aspect, wherein the computing device is further configured to: A) receive a plurality of signals from the remote device over a period of time, wherein individual ones of the plurality of signals comprises at least one respective data value for at least one data variable; B) determine that the at least one respective data variable has not changed more than a threshold value amount over a particular time period; and B) in response to determining that the at least one respective data value has not changed more than the threshold value amount over the particular time period, send instructions to the remote device to decrease a frequency of transmission of future signals.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
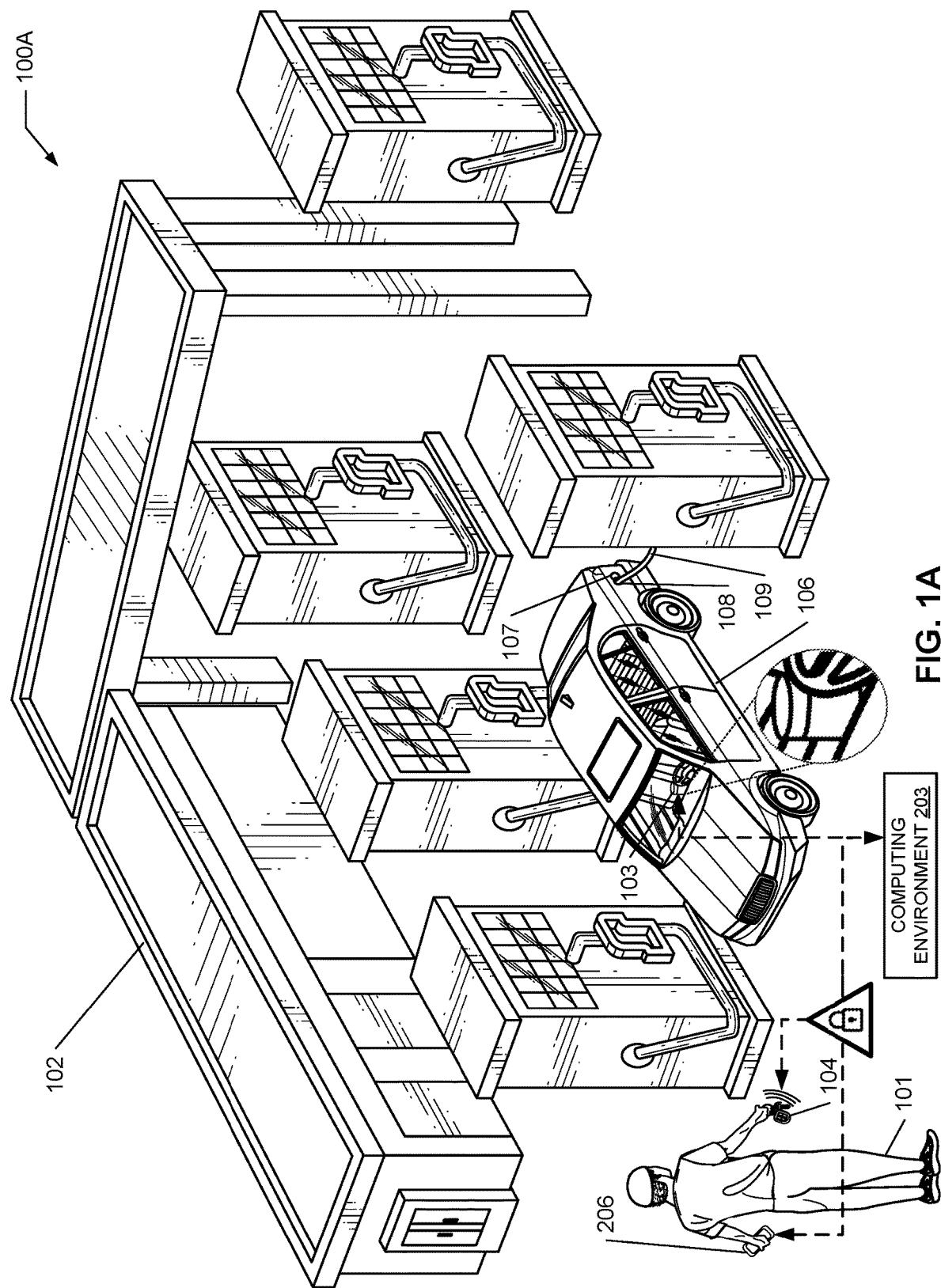
FIG. 1A shows exemplary environments in which the present security devices may operate according to one embodiment of present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein "intrusion event" can refer to any anomalous or undesirable activities occurring in or around a vehicle. Non-limiting examples of intrusion events include attempted or successful entry of an individual into a vehicle, operation of the vehicle, theft of vehicle components or contents, vandalism, sabotage, misplacement of a mobile device or remote device, fuel contamination, and interference with vehicle fueling processes.

Overview

Aspects of the present disclosure generally relate to detecting and responding to activities occurring in and around a vehicle.

EXEMPLARY EMBODIMENTS

Referring now to the figures, for the purposes of example and explanation of the fundamental processes and components of the disclosed systems and processes, reference is made to FIG. 1, which illustrates an environment 100A in which one or more security devices 103 may operate. As will be understood and appreciated, the exemplary environment 100 and security device 103 shown in FIG. 1A, as well as elements shown in subsequent figures, represent merely one approach or embodiment of the present system, and other aspects are used according to various embodiments of the present system.

Figure 1B:
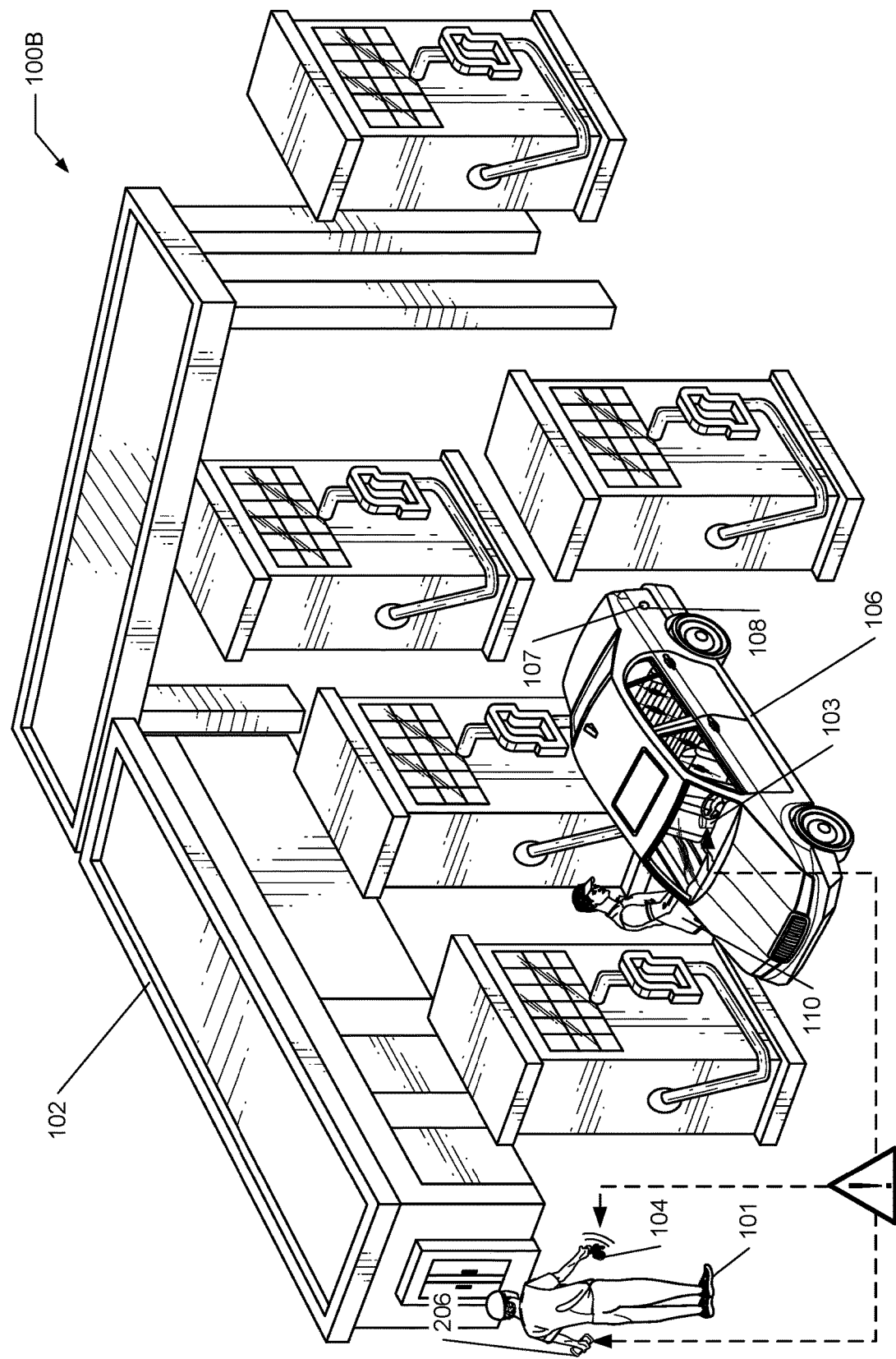
FIG. 1B shows exemplary environments in which the present security devices may operate according to one embodiment of present disclosure.

FIG. 1A shows an exemplary environment 100 in which embodiments of the present system may operate. The environment 100 includes a point of interest (POI) 102, a subject 101, and a vehicle 106 of the subject 101. The vehicle 106 can include a fuel cap 107 and a fuel inlet 108. The POI 102 can be any physical location, such as a gas station, electric vehicle charging station, retailer, or restaurant. For the purpose of showing and describing exemplary aspects of the present systems and processes, the subsequent description refers to the POI 102 as a gas station. FIGS. 1A-B show an exemplary scenario of determining the vehicle 106 is at the POI 102, determining that the subject 101 has moved away from the vehicle 106, determining a potential intrusion is occurring at the vehicle 106, and performing various actions in response to one or more of the determinations.

One or more security devices 103 can be installed on and/or into a vehicle 106 of a subject 101. The security device 103 can communicate with a computing environment 203 (see FIG. 2), one or more sensors 218 (not shown, see FIG. 2), one or more remote devices 104, the vehicle 106, and one or more mobile devices 206. The sensors 218 are omitted in FIGS. 1A-C. FIG. 2 and the accompanying description provide various details and exemplary aspects of the security device 103, remote device 104, computing environment 203, sensors 218, and the mobile device 206 according to various embodiments of the present disclosure. In one or more embodiments, the security device 103 and/or computing environment 203 can include one or more embodiments of security devices and security systems shown and described in U.S. application Ser. No. 16/988,436, filed Aug. 7, 2020, entitled "SYSTEMATIC INTEGRATION VIA AN INTRUSION DETECTION DEVICE," the disclosure of which is incorporated herein by reference in its entirety. In some embodiments, the security device 103 is referred to as a "sensing" device. In at least one embodiment, a security system includes, but is not limited to, one or more security devices 103, one or more remote devices 104, one or more sensors 218 (FIG. 2), and the computing environment 203. In some embodiments, the security system is referred to as a "sensing" system.

The security device 103 can monitor the status of the vehicle 106 and remote device 104 and can detect various activities occurring in and around the vehicle 106. The security device 103 can determine that the vehicle 106 and/or the remote device 204 are at a particular location. The security device 103 can receive and analyze readings from the remote device 204 and, based at least in part on the analysis, determine that the subject 101 is moving toward or away from the vehicle 106. The security device 103 can receive sensor readings and/or system readings from the vehicle 106 and determine that a) the fuel cap 107 has been opened or closed, b) a fuel pump 109 has been inserted into or removed from the fuel inlet 108, and/or c) fuel has been added to or removed from the vehicle 106.

The security device 103 can determine a current location of itself, the vehicle 106, and/or the mobile device 206. The security device 103 can determine that a current location corresponds to one or more points of interest, such as the POI 102. The security device 103 can initiate various actions in response to determining that the current location is at POI 102. Non-limiting examples of actions include receiving data from the mobile device 206, transitioning the security device 103, one or more sensors, and/or the mobile device 206 into one or more predefined operational modes, generating various light, sound, and/or tactile effects, updating a user interface, or transmitting an alert. In one example, in response to determining the vehicle 106 is at the POI 102, the security device 103 transitions into an armed mode. In another example, the security device 103 activates a sensor configured to detect fueling of the vehicle 106. In another example, the security device 103 receives a video feed from a sensor and streams the video feed to a smartphone or other computing device of the subject 101. In another example, the security device 103 adjusts one or more settings of the remote device 104, such as decreasing transmission power or transmission frequency.

The security device 103 can transmit signals to and receive signals from the remote device 104. The remote device 104 can include a key fob or other transportable electronic device carried by or attached to the subject 101. The remote device 104 can include one or more sensors 218 (not shown, see FIG. 2). The sensor of the remote device 104 can generate motion data corresponding to movement of the remote device 104. In a particular example, the remote device 104 includes an accelerometer that generates readings responsive to the motion of the remote device 104. The motion data generated at the remote device 104 can indicate behavior of the subject 101 carrying the same. The security device 103 can process readings from the remote device 104 to generate various determinations including, but not limited to, identifier of the remote device 104, battery level, transmission power setting, transmission frequency setting, and whether the remote device 104, or the subject 101 carrying the same, is moving toward or away from the vehicle 106 and/or the security device 103. In one example, the security device 103 receives motion data associated with a sensor of the remote device 104 and analyzes the motion data to determine one or more patterns present therein. Continuing the example, the security device 103 determines that the pattern meets a predetermined threshold pattern of movement away from the security device 103 and/or vehicle 106. In the same example, in response to the determination, the security device 103 transitions into an armed mode. As further discussed herein, in the armed mode, the security device 103 can detect potential intrusions into the vehicle 106 and perform one or more response actions, such as generating an alarm.

In an exemplary scenario, the subject 101 parks the vehicle 106. The security device 103 determines a current location of the vehicle 106, compares the current location to one or more point of interest databases, and, based on the comparison, determines that the vehicle 106 is parked at the POI 102. In response to the determination, the security device 103 initiates one or more actions including, but not limiting to, determining one or more categories with which the POI 102 is associated, downloading a profile based on the one or more categories, configuring one or more settings of the remote device 104 (e.g., based on the downloaded profile and/or by applying predetermined rules), receiving readings from the remote device 104, entering or transitioning into a particular mode, updating a user interface, and generating a sound, light, and/or tactile effect at the security device 103, the remote device 104, or the vehicle 106, or transmitting an alert to a mobile device or user account associated with the subject 101.

Continuing the scenario, the security device 103 determines that the POI 102 is associated with a "gas station" category. In response, the security device 103 activates a sensor (not shown) configured to generate readings corresponding to a fueling state of the vehicle 106. In response to activation, the sensor generates readings for indicating one or more of a) transition of the fuel cap 107 from a closed to an opened state, b) insertion of a fuel pump 109 into the fuel inlet 108, and c) addition of fuel to the vehicle 106. The security device 103 receives and analyzes readings from the activated sensor and, based on the analysis, determines that the vehicle 106 is currently being fueled. The security device 103 receives and analyzes motion data from the remote device 104 and, based on the analysis, determines that the subject 101 is moving away from the vehicle 106. In response to the determination that the vehicle 106 is at the POI 102 and the subject 101 is moving away from the vehicle 106, the security device 103 enters an armed mode. In the armed mode, the security device 103 receives and analyzes sensor readings to detect any potential intrusions into the vehicle 106 or other anomalous activities occurring in or around the same. In response to entering the armed mode, the security device 103 transmits an indication of entering the armed mode to one or more of the remote device 104, mobile device 206, and the computing environment 203.

FIG. 1B shows an exemplary environment 100B. For the purposes of showing and describing exemplary aspects of the present systems and processes, the environment 100B is presented as temporally subsequent to the environment 100A shown in FIG. 1A.

Continuing the above scenario of FIG. 1A, the security device 103 receives additional signal from the remote device 104. The security device 103 analyzes the signal and determines that a received signal strength indicator (RSSI) value associated therewith meets a predetermined threshold. Alternatively, or in addition, the security device 103 determines that additional motion data received via the signal meets a second predetermined threshold. In response to determining the RSSI value meets the predetermined threshold (e.g., and/or in response to determining that the additional motion data meets a second predetermined threshold), the security device 103 determines that the remote device 104 and the subject 101 have moved beyond a predetermined range of the vehicle 106. In response to the determination, the security device 103 commands the remote device 104 to adjust one or more settings for power conservation, such as, for example, reducing transmission signal strength, reducing transmission frequency, reducing sensor measurement frequency, or reducing sensor power.

Continuing the scenario, the security device 103 analyzes readings from one or more sensors and determines that a second subject 110 has moved within a predetermined range of the vehicle 106. In response to determining that the subject 110 has moved within a predetermined range of the vehicle 106, the security device 103 transmits a first alert to the mobile device 206 of the subject 101. The security device 103 detects that the fuel pump 109 has been removed from the fuel inlet 108 and/or that the fuel cap 107 is closed over the fuel inlet 108. In response to this determination and the subject 110 movement determination, the security device 103 performs additional actions, such as transmitting a second alert to the mobile device 206, activating audio and/or light effects at the vehicle 106, preventing ignition of the vehicle 106, or streaming a video feed from a camera sensor to the mobile device 206.

Figure 1C:
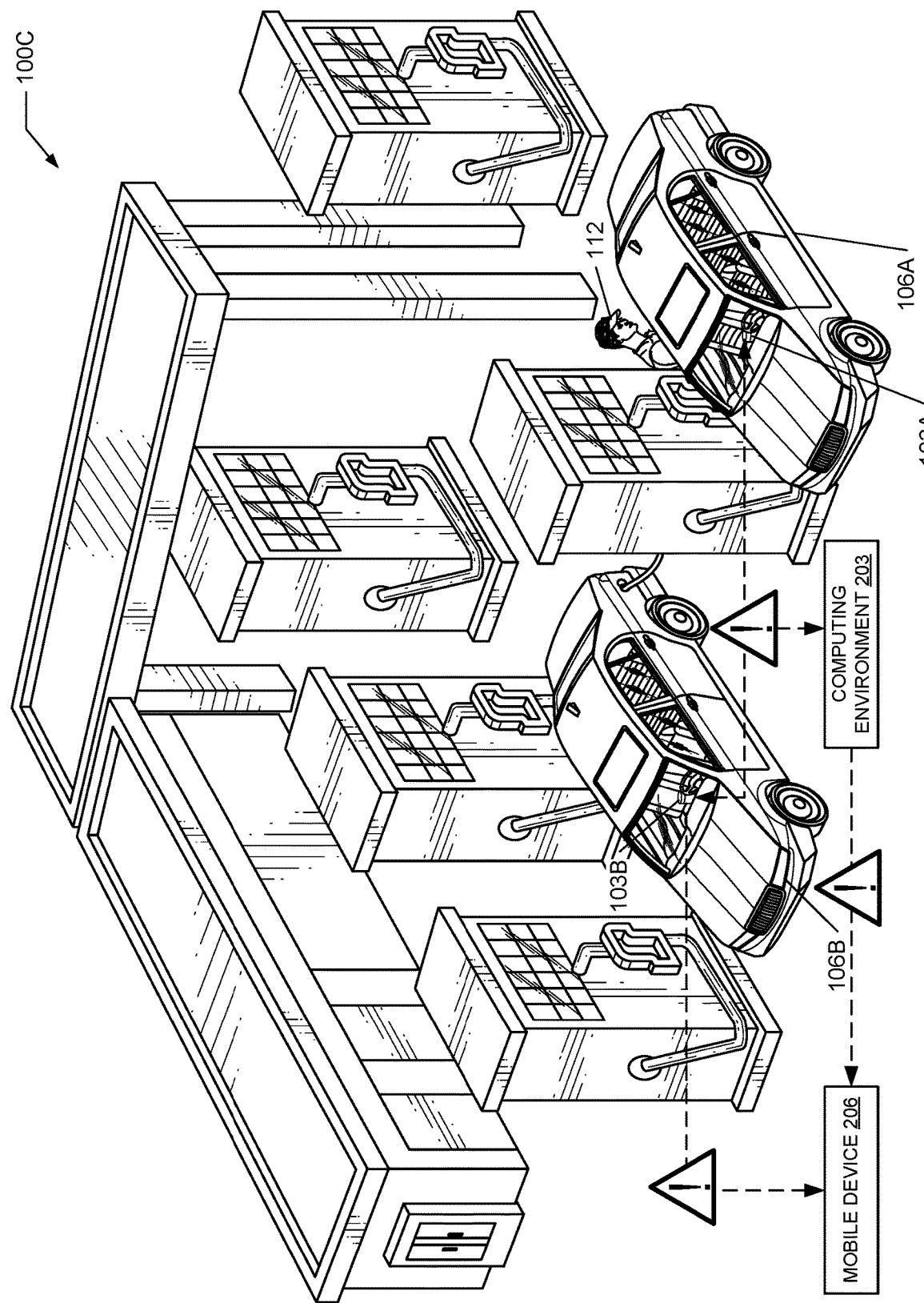
FIG. 1C shows exemplary environments in which the present security devices may operate according to one embodiment of present disclosure.
Figure 2:
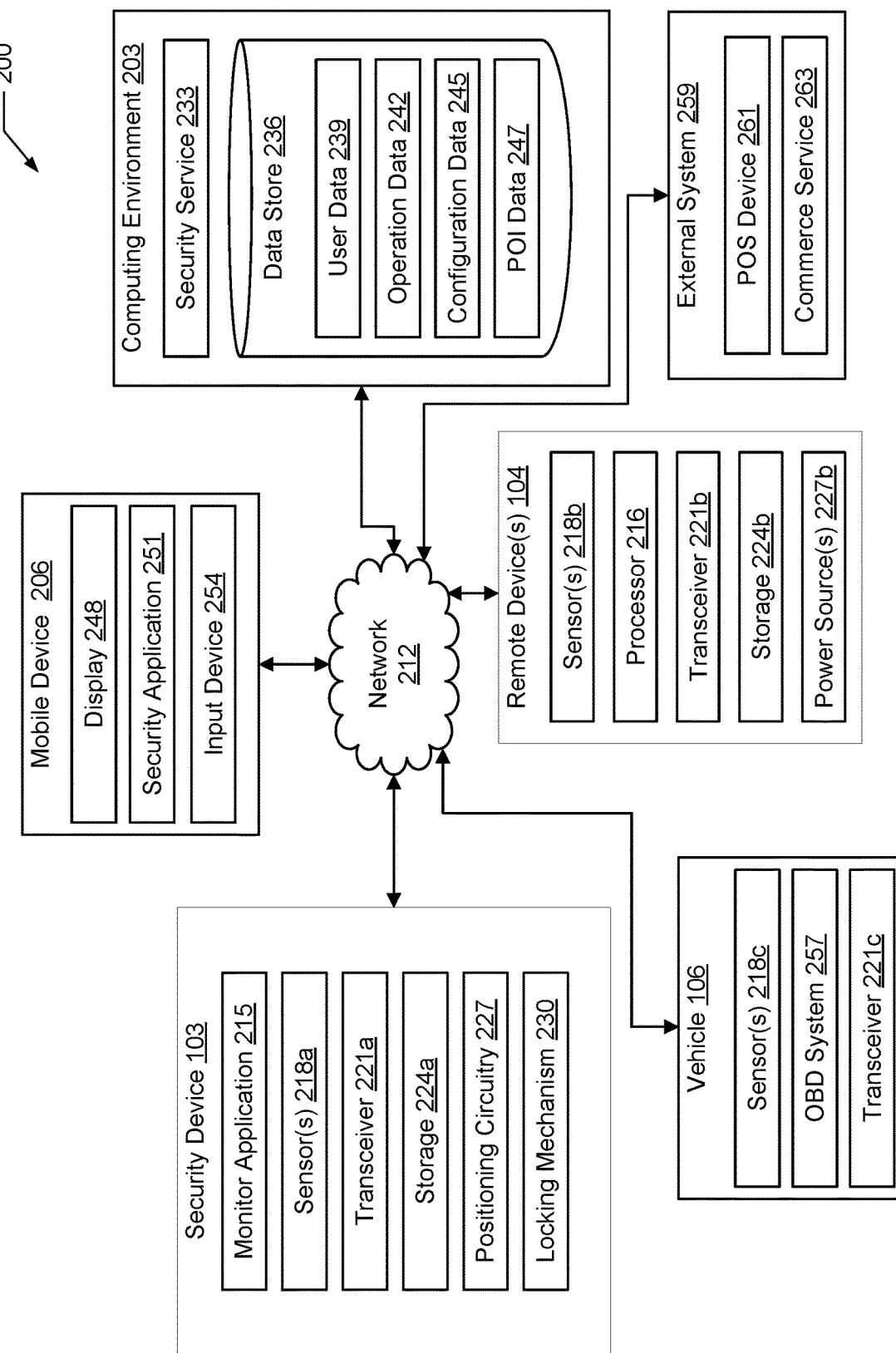
FIG. 2 is a diagram of an exemplary networked environment in which the present security system may operate according to one embodiment of the present disclosure.

FIG. 1C shows an exemplary environment 100C. As shown in FIG. 1C and described herein, multiple security devices 103A, 103B can communicate via any suitable wireless means. Communication between the security devices can allow the security system to extend coverage by alerting a subject to anomalous behavior occurring in other person's vehicles located near the subject's vehicle. For example, car thieves often break into multiple vehicles parked along the same street. In this example, vehicle owners may avoid break-ins and/or have a greater chance of deterring or catching an intruder if they are alerted to initial break-in activity at any vehicle on the street (e.g., before a thief has time to break into additional vehicles on the street). The present disclosure addresses the above need by providing security systems and processes in which nearby security devices can be leveraged to extend intrusion and other anomalous activity detection (e.g., regardless of whether the security devices are associated with the same user or multiple, different users).

FIG. 1C shows an exemplary scenario of communication between a first security device 103A installed into a first vehicle 106A and a second security device 103B installed into a second vehicle 106B. In this exemplary scenario, the security device 103A enters an armed mode and detects anomalous activity at the vehicle 106A. The anomalous activity can include movement of a subject 112 within a predetermined proximity of the vehicle 106A, entry of the subject 112 into the vehicle 106A, manipulation of door handles or other components of the vehicle 106A, removal or manipulation of fuel from the vehicle 106A, or damage to one or more elements of the vehicle 106A (e.g., window fracture, tire puncture, catalytic converter removal, light break, etc.).

Continuing the scenario, in response to determining anomalous activity is occurring or has occurred at the vehicle 106A, the security device 103A transmits an alert to the security device 103B and/or the computing environment 203. The computing environment 203 determines that the security device 103B is within a predetermined proximity of the security device 103A. In response to the determination, the computing environment 203 transmits a second alert to the security device 103B and/or a mobile device 206 with which the security device 103B is associated. The second alert indicates that a nearby vehicle is experiencing or has experienced anomalous activity (e.g., which may be described in the alert). Alternatively, the security device 103B receives the first alert from the security device 103A and, in response, transmits the second alert to the mobile device 206 with which the security device 103B is associated.

In the above scenario, the security devices 103A, 103B can perform additional actions such as generating audio and/or light effects at the vehicles 106A, 106B, transmitting an alert to emergency or security services, streaming sensor data to one or more mobile devices 206, storing one or more buffer intervals of sensor data, or disabling the vehicles 106A, 106B.

FIG. 2 shows a networked environment 200 according to various embodiments of the present disclosure. The networked environment 200 includes one or more security devices 103, a computing environment 203, one or more mobile devices 206, one or more vehicle 106s, and one or more remote devices 209 in communication via a network 212. In some embodiments, the security device 103 may communicate with the vehicle 106 over a first network (e.g., via an OBD port), the remote device 104 via a second network 212, and communicate to the computing environment 203 and the mobile device 206 via third network 212. In one example, the security device 103 communicates with the vehicle 106 via an OBD port, communicates with the remote device 104 via a radio transceiver, and communicates with the computing environment 203 via Wi-Fi. In some embodiments, the security device 103 communicates with other security devices. For example, a first security device 103 installed in a first vehicle communicates with a second security device 103 installed in a second vehicle. In another of examples, a subject owns a fleet of vehicles and a security device 103 is installed in each vehicle and configured to communicate with security devices installed in each other vehicle. In at least one embodiment, the security device 103 may not communicate with the vehicle 106 and/or any remote devices 209.

The security device 103 can include a monitor application 215, one or more sensors 218a, one or more transceivers 221a, one or more storage devices 224a, positioning circuitry 227, and one or more locking mechanisms 230. The security device 103 can include a circuit board with an embedded computing device or system-on-a-chip (SOC) architecture. The security device 103 can include a power source and/or be powered via a wired or wireless connection to the vehicle 106. The security device 103 can include a computing device with a processor and memory to execute the monitor application 215.

The monitor application 215 can read measurements from each of the sensors 218a. Based on the measurements, the monitor application 215 can determine whether an unauthorized interaction is in progress or has taken place. Non-limiting examples of unauthorized interactions include, but are not limited to, intrusions, vandalism, material harm, material theft (e.g., of vehicle components, fuel, or belongings within the vehicle 106), and aggressive or unlawful operation of the vehicle 106. The monitor application can receive and analyze sensor and other signal readings from the remote device 104, additional security devices 103, and the computing environment 203. For example, the monitor application 215 receives and analyzes motion data from the remote device 104. In another example, the monitor application 215 receives signal from the remote device 104 and determines one or more of RSSI value, transmission frequency, and current settings of the remote device 104.

The monitor application 215 can initiate various actions and commands at the security device 103 (e.g., and other security devices), the remote device 104, the vehicle 106, the computing environment 203, and the mobile device 206. The monitor application 215 can be executed by a processor of the security device 103 to receive measurements from the sensors 218a, which can be stored in the storage device 224a. The monitor application 215 can send the measurements from the storage device 224a to the security service 233 via the network 212 using the transceiver 221a. The network 212 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The sensors 218 can sense various aspects of inside or outside of the vehicle 106 and potentially areas proximate the vehicle 106. The monitor application 215 can control settings of the sensor 218, such as, for example, power, reading frequency, reading intensity, and reading sensitivity. In some embodiments, the sensor 218 senses various aspects of the security device 103. In one example, the sensor 218 detects that the security device 103 is properly secured within the vehicle 106.

The sensor 218 can include, but is not limited to, passive infrared (PIR) sensors, microwave sensors, ultrasound sensors, auditory sensors including microphones and glass break sensors, temperature sensors, air quality sensors, ambient light sensors, video and still image cameras, proximity sensors, global positioning system (GPS) sensors, speed sensors, magnetic position or orientation sensors, accelerometers, compass, barometer, motion sensors including gyroscopic sensors, pressure sensors, weight sensors, radio frequency sensors including Bluetooth, WiFi, NFC and other RF sensors, tilt sensors, radar sensors, and light detecting and ranging (LiDAR) sensors. The sensors 218 can also include one or more emitting components, such as emitting radar, laser light, visible light, infrared light, ultraviolet light, microwaves, or other emissions for use with various sensors 218. In one example, the sensor 218 is a video recording device comprising an upwardly facing wide-angle camera for detecting a 360-degree view of the interior of the vehicle 106. In certain embodiments, the PR sensor 218, speaker, GPS sensor 218, and other sensors 218 may be positioned in optimal locations within the apparatus for optimizing performance (e.g., the PR sensor 218 may be positioned on the driver's side of the apparatus to better detect carjacking intrusions, etc.). In one example, the sensor 218 is attached to the vehicle 106 proximate a fuel cap, fuel inlet, or a fuel tank door, and the sensor 218 is configured to detect opening and closing of the fuel cap and/or insertion and removal of articles into and from the fuel inlet. In another example, the sensor 218 can measure any inflow or outflow of fuel from the fuel inlet of the vehicle 106. In some embodiments, the security device 103 can receive a current fuel level from the vehicle 106 (e.g., via the OBD port) and monitor for changes in fuel levels.

In one or more embodiments, the sensor 218 reads various data and statuses of the vehicle 106 via an OBD port or other suitable connection to an electronic system of the vehicle 106. The one or more sensors 218 may operate simultaneously, and each sensor 218 may communicate its readings to the monitor application 215. In various embodiments, the sensor readings may be communicated along a data bus, or each sensor 218 may include its own designated port, or communication session on a circuit board. Examples of sensor readings include, but are not limited to, captured image, video, or audio data and values for tire pressure, fuel level, vehicle weight, seat weight, seat position, temperature (e.g., discrete temperature or a rate of change of temperature), humidity, distance, orientation (e.g., tilt), weight, reflected signal strength, and other measurements.

The remote device 104 and the sensor 218 can each operate in a variety of modes including, but are not limited to, low power mode, high power mode, low sensitivity mode, high sensitivity mode, low frequency mode, high frequency mode, and various combinations of two or more modes. Additional description of sensor operating modes are shown and described in disclosures incorporated herein by reference. The monitor application 215 can configure the operation in a particular mode automatically, for example, in response to a predetermined schedule, in response to receiving a command or request, or in response to determining that a sensor reading meets particular criteria, such as a threshold or particular value. The monitor application 215 can configure the operation mode and/or other settings of the remote device 104 and/or sensor 218 based on additional determinations, such as a determination that the vehicle 106 is at a location associated with a particular category. For example, in response to determining that the vehicle 106 is at a location associated with an "uncovered street parking" category, the monitor application 215 retrieves a category-associated device profile from storage 224a or from POI data 247 at the data store 236. Continuing the example, the monitor application adjusts the settings of the remote device 104 and/or one or more sensors 218 based on the device profile (e.g., increasing transmission power and frequency of the remote device 104, configuring the sensor 218 to a high power, high sensitivity mode, etc.).

In low power mode, the remote device 104 or the sensor 218 can be configured to operate at a lower power usage level, for example, by reducing power to an emitting component, by reducing a strength and/or frequency of sensor measurements, or by reducing power to or deactivating other components. In some embodiments, one or more sensors 218 are disabled during low-power mode, while other sensors 218 stay enabled. In one example, in low power mode, a microwave sensor is disabled while a PIR sensor remains enabled (e.g., and is configured to reduce a power usage of the sensor).

In high power mode or normal power mode, the remote device 104 or the sensor 218 can be configured to operate at a higher power usage level for purposes including, but not limited to, enabling high-frequency and/or high power measurements to be performed, allowing a transceiver to operate at a greater transmission range or strength, and other purposes. In some embodiments, the low power mode includes configuring the remote device 104 or sensor 218 in the low sensitivity and/or low frequency modes and the high power mode includes configuring in the high sensitivity and/or high frequency modes.

In low sensitivity mode, one or more thresholds for controlling configuration or performance of the sensor 218 can be configured at higher values. In one example, the sensor 218 measures reflected sound waves to detect individuals and their proximity to the device and thus to the vehicle, and the sensor 218 can have a reflected power threshold related to the power of reflected signal received at the sensor 218. In the same example, upon the reflected power threshold being exceeded, configuration to high power mode and transmission of an alert can occur. Continuing this example, in the low sensitivity configuration, the reflected power threshold can be increased such that a greater reflected signal power is required to trigger the high power mode and alert transmission. The low sensitivity mode can be configured, for example, to prevent the device taking action in response to potentially false positives.

In high sensitivity mode, one or more thresholds for controlling configuration or performance of the sensor 218 can be configured at lower values. In one example, the sensor 218 measures sound of a particular frequency range and comprises a decibel measurement threshold that, when exceeded, causes the sensor 218 to configure a high power mode and transmit an alert. In the same example, in the high sensitivity configuration, the decibel measurement threshold is decreased such that a lower decibel level within the particular frequency range, when measured, causes the reconfiguration to high power mode and transmission of the alert. In another example, a sensitivity of a microwave sensor is increased to detect movement occurring outside of a vehicle 106. The high sensitivity mode can be configured, for example, to potentially increase vehicle security by providing a lower caliber of criteria to be satisfied before a potential intrusion is determined and appropriate actions are taken. In some embodiments, a sensitivity of a first sensor is increased and a second sensitivity of a second sensor is maintained. For example, a sensitivity of a microwave sensor is increased while a sensitivity of a PIR sensor is unchanged.

In the low frequency mode, the sensor 218 can be configured to perform measurements at a lower frequency rate, whereas, in the higher frequency mode, the sensor 218 can be configured to perform measurements at a higher frequency rate than in lower frequency mode. In one example, the sensor 218 is a pressure sensor that, in the low frequency mode, measures the internal pressure of a vehicle at a rate of about 0.5 Hz and, in the high frequency mode, measures the internal pressure at 2.0 Hz. In another example, the sensor 218 is a camera that, in the low frequency mode, captures an image of the vehicle interior every 20 seconds and, in the high frequency mode, captures a video stream at 5 frames per second. In another example, the sensor 218 is an ultrasonic sensor that, in the low frequency mode, emits acoustic signals at a rate of about 1.0 Hz and, in the high frequency mode, emits the acoustic signals at a rate of about 10 Hz. In this example, the emission of the acoustic signals can be configured via a general purpose input/output (GPIO) pin at the sensor 218 or security device 103 in control thereof.

The low and high frequency modes can, alternatively or in addition, include adjusting a frequency at which the security device 103 reads measurements from the sensor 218. For example, in the low frequency mode, the monitor application 215 is configured to read an ultrasonic sensor at a rate of about 0.1 Hz and, in the high frequency mode, is configured to read the ultrasonic sensor at a rate of about 1.0 Hz.

The monitor application 215 can generate one or more geofences around the vehicle 106, the subject's mobile device 206, or a particular location (e.g., which may be entered into the security application 251 or automatically determined, for example, via position circuitry 227). The one or more geofences can surround one or more corresponding geozones. The monitor application 215 can analyze location data from the positioning circuitry, the mobile device 206, or the OBD system 257 to determine if the security device 103, mobile device 206, or vehicle 106 has moved beyond the geofence. The monitor application 215 can analyze sensor readings to determine if a subject has moved within a geofence around the vehicle 106. For example, the monitor application 215 analyzes a video feed from a camera sensor, identifies a subject in the video feed, and determines that the subject is within the geofence. In another example, the monitor application 215 analyzes PIR sensor readings and determines that the PIR sensor readings include a pattern associated with a subject moving within the geozone.

The monitor application 215 can generate concentric geozones of varying dimension about a target. For example, the monitor application 215 generates a first and a second geozone around the vehicle 106. In this example, the first geozone includes a first diameter and the second geozone includes a second diameter that exceeds the first diameter. The monitor application 215 can detect movement of a subject, remote device 104, vehicle 106, and/or computing device 204 into or out of each geozone. For example, the monitor application 215 detects that a remote device 104 passes beyond a first geozone and a second geozone of greater dimension than the first geozone. Continuing this example, in response to the detection, the monitor application 215 determines that the remote device 104 (e.g., or a subject carrying the same) is moving away from a vehicle 106 about which the first and second geozones were generated. In another example, the monitor application 215 detects that an individual passes through a first geozone and a second geozone of smaller dimension than the first geozone. Continuing the example, in response to the detection, the monitor application 215 determines that the individual is approaching a security device 103 about which the first and second geozones were generated.

The monitor application 215 can generate multiple geozones at different locations. For example, the monitor application 215 generates a first geozone about a vehicle 106 and generates a second geozone about a point-of-interest (POI). Continuing the example, the monitor application 215 detects that a remote device 104 moves beyond the first geozone and into the second geozone. In the same example, in response to the detection, the monitor application 215 determines that a subject carrying the remote device 104 has left the vehicle 106 and entered the POI. The monitor application 215 and/or computing environment 203 can perform analyses regarding geozones at different locations. For example, the computing environment 203 compares geozones generated by two monitor applications 215, each monitor application 215 being associated with a different security device 103 installed in a different vehicle 106. Continuing the example, based on the comparison, the computing environment 203 determines that the geozones overlap and, in response, configures intrusion detection processes such that potential intrusion events detected at the monitor application 215 of the first vehicle 106 are transmitted to the monitor application 215 of the second vehicle 106, and vice versa.

The monitor application 215 can manage the configurations of each of the sensors 218 individually or in the aggregate. In some embodiments, a reading from a first sensor 218 can cause the monitor application 215 to make a configuration change to a second sensor 218. The monitor application 215 can configure the various sensors according to one or more rules in the configuration data 245. In some embodiments, the configuration settings for each sensor are determined by the security service 233 and sent to the monitor application 215 to apply to the sensors 218. In other embodiments, the monitor application 215 can receive the rules from the security service 233 and apply the rules to configure the security device 103 (e.g., the sensors 218a and other components) and potentially other devices, such as the vehicle 106 and the remote devices 209. Measurements from a first sensor 218 can be processed and analyzed in a local computing environment and determinations generated therefrom can be used to initiate a configuration change of a second sensor 218 from a low power mode to a high power mode (or vice versa).

In some examples, configuring the sensor corresponds to adjusting the way the monitor application 215 interacts with the sensor. The monitor application 215 may receive a stream of a video from a camera sensor 218 and only store at the predetermined frequency according to the configuration. In one example, the monitor application 215 can configure a camera sensor to continuously operate in a low frequency mode and a sound sensor to continuously operate in a high frequency mode. In this same example, upon the sound sensor detecting a sound of a frequency and decibel level that satisfies a predetermined threshold (e.g., such as a window breaking or door handle being operated), the camera sensor is re-configured to a high-frequency mode and captures a continuous video of the vehicle interior for a predetermined time period.

The sensor 218 can be configured to continuously record a predetermined period of activity at a predetermined refresh rate. In one example, a camera sensor continuously captures a threshold duration of video data in a buffer in real time, the buffer being overwritten by each subsequent capture. In the same example, in response to determining that an event has occurred, the most-recent buffer of video data can be retrieved to provide analyzable data for activity occurring in or around the vehicle 106 during the time period immediately preceding the event.

In some embodiments, one or more sensors 218 may correspond to one or more electrical components in communication with the monitor application 215 via one or more general purpose input and output pins. The monitor application 215 may generate a signal, such as an RS232 signal, an RS485 signal, an I2C signal, or other signal, to communicate with, read from, or configure the sensor 218. The sensor 218 may include an onboard memory with configuration options to store the configuration from the monitor application 215. In other embodiments, the sensor 218 may be configured based on an input voltage at one or more pins, and the monitor application 215 can control the output voltage (e.g., via a digital to analog converter, through pulse width modulation, or similar control) on the one or more pins to configure the sensor 218. In another embodiment, the sensor 218 may be configured based on a resistance between two or more pins, and the monitor application 215 can adjust a variable resistance to configure the sensor 218.

The monitor application 215 can be configured to perform various processes for supporting functions of the security device 103 including, but not limited to, processing sensor readings, analyzing sensor readings, and, based on the analyses, determining if an event has occurred. In some embodiments, the monitor application 215 can cause the security device 103 to undergo a change in operating mode. For example, the monitor application 215 can determine that readings from a sensor 218 exceed a predetermined threshold and, in response to the determination, the security device 103 can transition from a low power mode associated with passive sensor processing to a high power mode associated with transmitting sensor readings and generating alerts. In various embodiments, one or more functions of the monitor application 215 are performed at the computing environment 203.

The monitor application 215 can perform any suitable technique, algorithm, machine learning model, or artificial intelligence to process and analyze sensor readings and other signals, such as transmissions from transceivers 221a, 221b. Such approaches can be descriptive, inferential, predictive, prescriptive, exploratory, causal, and/or mechanistic in nature. The monitor application 215 can receive a plurality of signals from the remote device 104 over a period of time. The monitor application 215 can perform a regression analysis on the plurality of received signal strength indicator over the period of time to generate a regression model. The monitor application 215 can determine that a coefficient of correlation in the regression model meets a predefined threshold and that a time-based coefficient in the regression model is negative. In response to the determinations, the monitor application can determine that a subject carrying the remote device 104 is moving away from the vehicle 106 (or security device 103).

The monitor application 215 can analyze sensor data to determine if one or more patterns or other features are present therein. For example, the monitor application 215 analyzes motion data from an accelerometer to determine if one or more predetermined patterns are present therein. In another example, the monitor application 215 compares readings from an audio sensor to prerecorded audio clips of various intrusion activities (e.g., window break, forced entry, gas siphoning, catalytic converter theft, etc.) and determines that the audio sensor readings match a prerecorded audio file of a window break. In another example, the monitor application 215 compares and determines a mismatch between current occupied seat weight and seat position settings and historical occupied seat weight and seat position settings (e.g., thereby indicating that a vehicle seat is likely occupied by someone other than the typical occupant). In another example, the monitor application 215 analyzes image data from a camera sensor by applying one or more recognition algorithms, techniques, or models and, thereby, determine whether a particular feature is present in the image data (e.g., a subject associated with the vehicle 106, a potential intruder, an animal, etc.).

The monitor application 215 can determine a location of the security device 103 or the vehicle 106 via the positioning circuitry 227. For example, the monitor application 215 receives positional data from the positioning circuitry 227 and determines a current location of the vehicle 106 based on the positional data. The positional data can include, but is not limited to, latitude, longitude, geocentric coordinates, geocodes (e.g., geohashes, plus codes, geostrings, etc.), or any other data for representing a particular location or a distance between two locations. The monitor application 215 can determine if the security device 103, vehicle 106, or mobile device 206 is at a particular location, such as a point of interest (POI). The monitor application 215 can compare positional data to POI data 247 to determine if the positional data is proximate to, or distant from, one or more POIs. The monitor application 215 can determine, for example, a distance between a first location and a second location or a distance between a travel path, or other navigation route, and one or more locations or a second travel path.

The monitor application 215 can determine that a POI corresponds to one or more categories, which may be predefined in POI data 247 or generated by the monitor application 215 or a system in communication therewith. The monitor application 215 can determine that a POI, or other variable, corresponds to a category by performing a look-up process, such as, for example, comparing the POI (e.g., or data associated therewith, such as location, entity name, etc.) to POI data 247. For example, the monitor application 215 compares a current location to a relational database of POIs, locations, and corresponding categories. Continuing the example, the monitor application 215 determines that the current location matches a particular entry (e.g., based on location matching, threshold-satisfying proximity, POI name matching, etc.) and determines the POI category based on the assigned category for the particular entry.

The monitor application 215 can perform one or more classification techniques to generate or assign categories, such as, for example, local topic modeling, logistic regression, Naïve Bayes, k-nearest neighbors, decision trees, support vector machines, neural networks and other suitable machine learning- or artificial intelligence (AI)-based techniques. The monitor application 215 can determine that a POI, or other variable, corresponds to one or more categories by applying one or more predefined rules associated with the category. For example, to determine if a POI corresponds to a "gas station" category, the monitor application 215 applies a keyword filter to a text description of the POI, determines that the text description includes keywords "fuel" or "gas" and classifies the POI into the gas station category based on the determination. Non-limiting examples of rules include proximity thresholds, keyword whitelists and blacklists, time intervals, user whitelists and blacklists, and weather conditions.

The monitor application 215 can cause various audio, light, and/or tactile effects to be generated by the security device 103, the vehicle 106, the remote device 104, or the mobile device 206. For example, the monitor application 215 activates a light ring on the security device 103. In another example, the monitor application 215 causes a speaker of the security device 103 and/or the vehicle 106 to emit an alarm tone. In another example, the monitor application 215 activates a vibration element of the security device 103.

The monitor application 215 can enable or disable the transceiver 221a or a transceiver 221B of the remote device 104. The transceivers 221a-b can communicate via radio transmission. The transceivers 221a-b can communicate with the network 212 via an internet connection. The internet connection can correspond to a cellular data connection, a satellite data connection, a WiFi connection, or some other connection. In one embodiment, the security device 103 can connect to a WiFi network provided by the vehicle 106. In another embodiment, the security device 103 can use a first transceiver 221 to access or provide a cellular or satellite data connection, and the security device 103 can use a second transceiver 221 to provide a WiFi hotspot in the vehicle 106. The vehicle 106 or a mobile device 206 may utilize the WiFi hotspot to access the internet via the first transceiver and the second transceiver.

The transceivers 221a-b can be configured for sending and receiving data via the network 212. The monitor application 215, via the transceiver 221a, can transmit and receive various commands from the computing environment 203, the mobile device 206, and/or the remote device 104. In response to commands received at the transceiver 221a, various behaviors and parameters of the security device 103 (or components connected thereto) can be changed. For example, the monitor application 215 can receive a command instructing the security device 103 to enter a normal or high power mode. In response to receiving the command, the monitor application 215 can automatically re-configure the security device 103 from a low power mode to the normal or high power mode. As another example, the monitor application 215 can receive a request for sensor readings including a video of the interior of the vehicle 106. In this example, in response to receiving the request, the monitor application 215 can retrieve and transmit buffer data comprising the video to the computing environment 203, to the mobile device 206, or to a particular destination provided in the request.

The monitor application 215 can adjust one or more settings of the transceivers 221a, 221b including, but not limited to, (dis)activation interval, transmission power, transmission frequency, sensor power, and sensor frequency. In one example, the transceiver 221b transmits a signal to the transceiver 221a, the signal being transmitted at a first power level and a first frequency and including motion data measured by an accelerometer of the remote device 104. Continuing the example, the monitor application 215 analyzes the motion data and determines that the remote device 104 has experienced a movement alteration beyond a threshold amount. In the same example, in response to the determination, the monitor application 215, via the transceiver 221a, commands the remote device 104 to adjust settings of the transceiver 221b to transmit signal at a second power level and a second frequency, which may be less than or greater than the first power level and first transmission frequency. The adjustment of transceiver settings by the monitor application 215 can provide various advantages, such as improved power conservation and efficient communication of sensor data (e.g., sensor data communication is conducted at a lower rate when said sensor data is below one or more thresholds, and is conducted at a higher rate when said sensor data meets or exceeds the one or more thresholds).

In one example, the transceiver 221b can continue to transmit at the same, lower, or higher power level and/or frequency level if the monitor application 215 does not measure a change in motion from the remote device 104. In some embodiments, the remote device 104 can measure little to no movement of the remote device 104 by recording and analyzing accelerometer data. In some embodiments, the remote device 104 can wirelessly send accelerometer data to the monitor application 215 for processing. The monitor application 215 can measuring the signal strength of transmissions sent by the remote device 104 using the transceiver 221b. For example, if the signals from the remote device 104 that are received by the transceiver 221b do not change in signal strength, the remote device 104 is likely stationary relative to the security device 103 and/or the vehicle 106. In one embodiment, if the signal strength does not change, the monitoring application 215 can determine that the remote device 104 is stationary. In one example, if the monitor application 215 measures an increase in signal strength for signals sent from the remote device 104 that are received by the transceiver 221b, the monitor application 215 can determine that the remote device 104 is moving towards the security device 103. In another example, if the monitor application 215 measures a decrease in signal strength for signals sent from the remote device 104 that are received by the transceiver 221b, the monitor application 215 can determine that the remote device 104 is moving away from the security device 103.

If the monitor application 215 of the security device 103 does not measure a change in motion from the remote device 104 for a particular time frame, the monitoring application 215 can send instructions to the remote device 104 to reduce the power level and/or the frequency of transmission to conserve battery life. If the monitor application 215 measures a reduction in signal strength for signals from the remote device 104, the monitoring application 215 can send instructions to the remote device 104 to increase the power level. If the monitor application 215 measures an increase in signal strength for signals from the remote device 104, the monitoring application 215 can send instructions to the remote device 104 to decrease the power level to preserve battery life. In some embodiments, the monitoring application 215 can compute a specific power level based on the current power level and the signal strength measured at the transceiver 221b. As a non-limiting example, the monitoring application 215 can determine that the signal strength is −30 dBm while a signal strength of −70 dBm would acceptably transfer the data. The monitor application 215 can send a message to reduce the power level of transmissions by 30% by the transceiver 221b of the remote device 104 to conserve battery life. The remote device 104 can adjust one or more power settings of the transceiver 221b based on the message from the monitoring application 215. In some embodiments, the monitor application 215 can repeatedly send messages to the remote device 104 to find the correct power level to achieve the most efficient transmission of messages. In some embodiments, the remote device 104 can increase the transmission power level of signals sent from transceiver 221b when motion is detected and reduce the transmission power level of signals sent from transceiver 221b when motion stops. In one embodiment, the remote device 104 can increase the transmission power level of signals sent from transceiver 221b to a maximum power when no messages have been received from the security device 103 for a predetermined threshold of time.

The storage 224 can provide data storage for interim data being used by the monitor application 215, such as historical sensor measurements including video and audio data among other data. The monitor application 215 may store and maintain one or more sensor data buffers on the storage 224 with a configured amount of sensor history. As an example, the storage 224 may include a video buffer with the most recent thirty seconds of video being stored. When an unauthorized event is detected, the monitor application 215 may capture and store sensor data (e.g., video, audio, or other sensor data) during the unauthorized event. The monitor application 215 may copy or otherwise initialize the sensor data for the unauthorized event with a portion or all of the sensor data buffers. The monitor application 215 may transmit the stored sensor data to the computing environment 203, either in real-time or in segments according to predetermined criteria. In some embodiments, the storage 224 includes information associated with one or more user accounts registered with the security device 103. For example, the storage 224 can include lists of contacts, payment processing information, addresses, and other data.

As an illustrative example, an unauthorized person may walk around the vehicle 106 from 1:00:01 PM to 1:00:27 PM, then proceed to break a window and enter the vehicle 106 from 1:00:28 PM to 1:00:45 PM. The monitor application 215 may sense an unauthorized person breaking the window or entering the vehicle 106, via one or more sensors 218 at 1:00:29 PM. At 1:00:29 PM, the sensor data buffer may include historical data measurements from 12:59:59 PM (e.g., if configured for a 30 second buffer), and the monitor application 215 can capture and store sensor data including the sensor data buffer from 12:59:59 PM (or a subset thereof). In this example, by using the sensor data buffer, even though the security device 103 doesn't trigger an alarm of the unauthorized person entering the vehicle 106 until 1:00:29 PM, the security device 103 can still provide sensor data from before the alarm was triggered.

The positioning circuitry 227 can include any circuit or device configured to generate or receive position data corresponding to historical locations and the current location of the security device 103.

The security device 103 can be mounted into the vehicle 106 to provide a user of the vehicle 106 with monitoring and notification when a malicious party interacts with the vehicle 106. The security device 103 can be secured into the vehicle 106 via the locking mechanism 230 to prevent the malicious party from being able to remove or disable the security device 103 during an unauthorized interaction with the vehicle 106, e.g., a break-in event. In one embodiment, the security device 103 has a form factor that fits within a cup holder of the vehicle 106. A body of the security device 103 can include a first portion and a second portion that can be rotated relative to one another. The locking mechanism 230 may engage when the first portion rotates relative to the second portion in a first direction and disengage when the first portion rotates relative to the second portion in a second direction. The first direction may be opposite the second direction. In some embodiments, the security device 103 permanently attaches to a windshield or window of the vehicle 106 (e.g., or to a bracket element affixed to the windshield or window).

The locking mechanism 230 can include an engaging component that can be enabled or disabled electronically, for example, in response to a command or in response to a particular sensor reading or determination generated therefrom. In some embodiments, the engaging and disengaging of the locking mechanism can be enabled or disabled by the monitor application 215. In one example, the security device 103 receives a command from the mobile device 206 to disable the locking mechanism 230 and, in response, the locking mechanism 230 receives a signal causing the engaging component to be disabled. In another example, the security device 103 receives signal from the remote device 104 and the monitor application 215 determines that the remote device 104 is within a predetermined distance and is associated with an identifier. In this example, in response to the determination, the locking mechanism 230 automatically disables the engaging component.

The computing environment 203 can include one or more mobile devices 206, a security service 233, and a data store 236. The elements of the computing environment 203 can be provided via a plurality of computing devices that may be arranged, for example, in one or more server banks or computer banks or other arrangements. Such computing devices can be located in a single installation or may be distributed among many different geographical locations. For example, the computing environment 203 can include a plurality of computing devices that together may include a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

The data store 236 can store various data that is accessible to the security device 103 and/or the mobile device 206, and is used by the networked environment to execute various processes and functions discussed herein. The data store 236 can be representative of a plurality of data stores 112 as can be appreciated. The data store 236 can include, but is not limited to, user data 239, operation data 242, configuration data 245, and point-of-interest (POI) data 247. In some embodiments, the user data 239, operation data 242, configuration data 245 and/or POI data 247 (or subsets thereof) are stored in storage 224, such as on the security device 103.

The user data 239 can include information associated with one or more user accounts. For example, for a particular user account, the user data 239 can include, but is not limited to, an identifier, user credentials (e.g., a username and password, biometric information, such as a facial or fingerprint image, cryptographic keys such as public/private keys, etc.), a name of an owner of the vehicle 106 in which the security device 103 is installed, contact information (e.g., phone number, email, etc.) for a user associated with the user account, user preferences for controlling processes in the networked environment 200, payment processing information (e.g., credit card number, expiration date, etc.), and information related to the vehicle 106 (e.g., a make, model, license plate number, etc.). In some embodiments, the user data 239, or a subset thereof, is stored in an encrypted format. For example, personally identifiable information (PII) associated with the user or the vehicle 106 can be encrypted such that access thereto requires a dual-authentication process, authentication of a public-private key pair, and/or other security measures.

The operation data 242 can include readings or measurements from the sensors 218 or other information related to the operation of the security device 103. The operation data 242 can include other historical information such as a history of mode transitions, a history of problems (e.g., data transmission errors, storage errors on storage 224 including file system corruptions, interruptions or disruptions to the power source 227*b*, failure of the locking mechanism 230, identification of an attempt to remove the security device 103 from vehicle 106, etc.). The readings and historical information can include timestamps such that the operation data 242 provides a time-series of data describing activities occurring in or around the vehicle 106.

The configuration data 245 can include parameters for controlling operation of each sensor 218. Non-limiting examples of parameters include, but are not limited to, sensor modes, schedules for controlling sensor behavior, sensitivity levels, power levels, thresholds, and other suitable parameters. The configuration data 245 can include an identifier corresponding to each sensor 218. In some embodiments, portions of the configuration data 245 that are co-temporal can be stored as a multi-dimensional storage object in which each dimension corresponds to a particular sensor 218 and/or sensing mode (e.g., video, audio, environmental, etc.).

The configuration data 245 can include various threshold values, benchmark values, or ranges of values for controlling processes described herein. In some embodiments, the storage 224 includes configuration data 245 associated with each sensor 218 in communication with the security device 103. The configuration data 245 can include one or more rules and configuration options for each security device 103. The rules can be configured by a user via the mobile device 206. As an example, a first rule for a first security device 103 may relate to privacy and specify that the GPS location of the vehicle is not to be transmitted or stored in the data store 236. A second rule for a second security device 103 may specify that the GPS location should be determined and sent continuously or at a predetermined frequency whenever an alarm is triggered. Other rules may include power usage restrictions (e.g. converting to low-power mode automatically at a preset battery level, disabling a particular sensor 218 until a measurement from another sensor 218 meets a configured threshold, etc.), authentication requirements (e.g., multi-factor authentication, etc.), and other rules.

The configuration data 245 can be retrieved by, for example, upon setup of the security device 103 and upon changes thereafter. When the security device 103 is offline, any changes to configuration data 245 may be held until the next communication with the security device 103 or upon a scheduled event, such as while parked in a garage with high speed internet. Other non-limiting examples of configuration data 245 include, but are not limited to, audio level thresholds, temperature thresholds, humidity thresholds, pressure change thresholds, emitted or reflected signal thresholds (e.g., heat signals, ultrasonic signals, etc.), tilt thresholds, weight thresholds, vehicle specific profiles, and combinations of thresholds. In one example, a first threshold for an audio sensor 218 comprises a value that, upon being exceeded by a reading of the audio sensor 218, causes the audio sensor 218 to transition from a lower power mode to a high power mode.

The configuration data 245 can include various states, settings, and statuses of the vehicle 106. The configuration data 245 can include, for example, occupied and unoccupied vehicle and/or seat weight values, seat position settings, climate control settings, entertainment settings, and historical performance and handling data. The monitor application data The POI data 247 can include information associated with physical locations. Non-limiting examples of POI data 247 include location name and nicknames, location affiliation (e.g., ownership, association with a particular entity, company, or brand, etc.), categorizations and classifications, operating hours of a merchant or other business at the location, reviews and ratings of the location, and safety incidents and reports associated with the location (e.g., police and theft reports, user generated reports, etc.). Non-limiting examples of categories include industry (e.g., medical, automotive, food service, retail, entertainment, childcare, wellness, pet care, recreation, etc.), business type (e.g., gas station, fast food restaurant, hospital, pre-school, golf course, etc.), cost rating (e.g., inexpensive, affordable, average price, high price, luxury, etc.), and safety (e.g., low risk, medium risk, or high risk, weather conditions, date and time, etc.). Safety categorizations can refer to risks of criminal activity overall or to risks of particular safety concerns, such as carjacking, vehicle theft, vehicle break-in, and vehicle vandalism. In one example, the monitor application 215 determines that a current location of the vehicle 106 is associated with a high-risk category for vehicle break-in. Continuing the example, in response to the determination, the monitor application 215 transitions the security device 103 to an elevated armed mode in which one or more sensors are configured for high sensitivity and/or high power operation.

In at least one embodiment, a category includes a classification of how likely a user is to be interested in a particular location, activity, or event. For example, a category includes low, medium, and high levels of estimated user interest. In this example, the monitor application 215, or a system in communication with the same, estimates low, medium, and high levels of user interest based on various data including, but not limited to, social media interaction data, navigation data, transaction data, user inputs, and historical data of additional users. Continuing the example, the monitor application 215 determines that the vehicle 106 is within a predetermined range of a high estimated interest event and, in response, transmits a notification to the mobile device 206.

The security service 233 is configured to be executed in the computing environment 203 to receive contextual data including sensor readings and other data from the security device 103. The security service 233 can receive, process, and respond to requests from the mobile device 206. The security service 233 can provide real-time data analyses, which can be used to determine a current status of the vehicle 106. The security service 233 can process the readings, compare the readings to user data 239, historical operation data 242 or configuration data 245, and generate various determinations based on the comparisons and other analyses. In one example, the security service 233 can receive and process a video stream from the security device 103. In this example, the security service 233 can execute object detection algorithms, machine learning algorithms, etc., on the video data for identifying features therein and determining if an event occurred, such as a person (e.g., a potential intruder) approaching or entering the vehicle 106.

The mobile device 206 can include one or more displays 248, a security application 251, and one or more input devices 254. The security application 251 can be executed to monitor and control the security device 103. In some embodiments, the security application 251 can communicate with the monitor application 215 directly or via the security service 233. The security application 251 can communicate with the security service 233 to determine various information about the security device 103 including determining a current mode, a current location, a history of events, sensor measurement information, a lock stage of the locking mechanism 230, and various other details. The security application 251 can generate user interfaces to display the various information and receive edits from a user. The security application 251 can communicate those edits to the security service 233 or monitor application 215 to adjust configuration properties of the security device 103.

The mobile device 206 can be any network-capable device including, but not limited to, smartphones, computers, tablets, smart accessories, such as a smart watch, key fobs, and other external devices. The mobile device 206 can include a computing device with a processor and memory. The mobile device 206 can include a display 248 on which various user interfaces can be rendered by the security application 251 to configure, monitor, and control the security device 103. The security application 251 can correspond to a web browser and a web page, a mobile app, a native application, a service, or other software that can be executed on the mobile device 206. The security application 251 can display information associated with processes of the security device 103. The mobile device 206 can include an input device 254 for providing inputs, such as requests and commands, to the mobile device 206. The input devices 254 can include a keyboard, mouse, pointer, touch screen, speaker for voice commands, camera or light sensing device to reach motions or gestures, or other input device. The security application 251 can process the inputs and transmit commands, requests, or responses to the security device 103 or the computing environment 203 based thereon. According to some embodiments, the mobile device 206 is maintained by a system user and is often physically separate and remote from the security device 103.

The security application 251 can implement an application programming interface (API) for facilitating communication with the security device 103 and/or computing environment 203. The security application 251 can transmit, modify, and store various data on the mobile device 206, such as, for example, an identifier corresponding to the security device 103 (or a user thereof) and other user data 239, operation data 242, or configuration data 245. In one example, the security application 251 can transmit arming and disarming commands to the security device 103 or computing environment 203 that cause arming or disarming processes to be initiated (see FIGS. 13, 14). In another example, the security application 251 transmits location data comprising a location of the mobile device 206 to the computing environment 203 that processes the location data to determine if the user is within a predetermined range of the vehicle 106.

When proximate to the security device 103, the security application 251 can communicate with the monitor application 215 via a local wireless communication, such as near field communication (NFC), Bluetooth, WiFi, or other wireless communications. The mobile device 206 may be considered proximate to the security device 103 when the mobile device 206 is within a wireless range of the security device 103 for the local wireless communication technology. In some embodiments, the monitor application 215 can transition to a different mode based on one or more mobile devices 206 entering or leaving the range of the wireless communication technology.

The remote device 104 can be a key fob or other mobile electronic device. The remote device 104 can include one or more sensors 218b, one or more processors 216, one or more transceivers 221b, one or more storage devices 224b, and one or more power sources 227b. The remote device 104 can include a computing device with a processor and memory to execute an application to perform various functionality discussed herein. The remote device 104 may comprise a secondary device configured generate sensor measurements remote from the security device 103. The sensor 218b can include, but is not limited to, motion sensors (e.g., accelerometer, gyroscope, a combination thereof, etc.) and location sensors, such positioning circuitry. In one example, the remote device 104 includes an accelerometer configured to generate motion data corresponding to movement of the remote device 104. Continuing this example, the accelerometer can include a gyroscope to perform motion measurements.

The remote device 104 can include a battery power source 226 or a renewable power source 226, such as a solar cell or kinetic-based power generation circuit. In some embodiments, the remote device 227b has a battery power source 227b and the security device 103 has a power source 227a that receives electrical energy from the vehicle 106.

The remote device 104 can communicate with the security device 103 via a transceiver 221b. The communication may utilize a close proximity and low power technology that may be wireless or wired, such as Bluetooth, NFC, Zigbee, Z-Wave, WiFi, or similar localized wireless RF communication. The remote device 104 may transmit measurements from sensors 218b to the monitor application 215 for further processing and transmission to the computing environment 203. In one embodiment, the remote device 104 reads measurements from sensors 218b at a frequency that is below the frequency of measurements read from sensors 218a to conserve power from power source 227b. In some embodiments, the remote device 104 only communicates with the security device 103. In at least one embodiment, the remote device 104 reads measurements at a lower sensitivity than the security device 103 to conserve power. As an example, the sensitivity of a first microwave sensor 218a is configured to be higher and use more power than the sensitivity of a second microwave sensor 218b. Similar to the security device 103, the remote device 104 can store sensor data locally on a storage 224b and transmit the sensor data from the storage 224b or can transmit the sensor data directly as read.

The vehicle 106 can include one or more sensors 218c, an on-board diagnostics (OBD) port 257, and one or more transceivers 221c. The vehicle 106 can communicate with the network 212 via a wireless transceiver 221c or wired connection. It can be appreciated that vehicles 106 include various technologies for collecting data such as GPS systems, diagnostic systems, vehicle status systems, and other systems. The vehicle 106 may obtain vehicle information natively such as tire pressure, a current location, an engine temperature, vehicle interior temperature, exterior temperature, a status of whether the vehicle 106 is running, a position of each window of the vehicle 106, any outstanding service or maintenance issues of the vehicle 106, a speed of the vehicle 106, a direction of travel of the vehicle 106, a count of miles traveled since starting the vehicle 106, a status of whether each door is opened or closed, a status of whether or not each door is locked or unlocked, a status of whether the hood or trunk is open or closed, a status as to whether the gas cap is secured, engine ignition attempts, a change in fuel levels, changes in pedal positions, changes in seat or other personalization settings, changes in entertainment system settings, a status of whether the vehicle 106 is in drive, reverse, park, neutral or other drive configuration, a status of which gear the vehicle is in, and other information related to the current or historical state of the vehicle 106.

The security device 103 can communicate with the vehicle 106 to obtain the vehicle information via a wireless connection or a wired connection. As an example, the security device 103 may have a cable plugged into a USB port, the OBD system 257, or some other wired standard to request and receive the vehicle information. In some embodiments, the security device 103 includes an external component that is inserted into an OBD port or USB port, and transmits data therefrom to the security device 103. In some embodiments, the security device 103 can also receive a power supply from a wired connection with the vehicle 106. As another example, the vehicle information can be obtained by the security device 103 via a wireless connection, such as WiFi or Bluetooth. In some embodiments, the vehicle information is gathered from the mobile device 206, such as, for example, via CarPlay or Android Auto and sent to the security service 233 or monitor application 215 for further processing (or processed on the mobile device 206). In one embodiment, the monitor application 215, security service 233, or security application 251 can communicate with an API of a service provided by the vehicle manufacturer or a third party to obtain the vehicle information, such as, for example, Mercedes®'s MBUX®, General Motor®'s OnStar® service, Chrysler®'s UConnect®, Amazon®'s Alexa®, SiriusXM®, or some other service. The vehicle 106 may natively transmit some or all of the vehicle information to the third party service natively.

The networked environment 200 can include one or more external systems 259 with which the security device 103, vehicle 106, computing environment 203, mobile device 206, and remote device 104 communicate. The external system 259 can include, for example, a manufacturer or other third party system associated with the vehicle 106 (e.g., OnStar®, UConnect®, etc.). The external system 259 can include an ecommerce system, such as, for example, systems provided by Amazon® or Uber®, as well as various payment processing services, and systems associated with particular businesses such as a restaurant or retailer. The external system 259 can include one or more POS devices 261 that are configured to facilitate transactions. In one example, a POS device 261 includes a near-field communication-based (NFC) payment device configured to detect and communicate with the security device 103 to obtain payment processing information. The payment processing information (e.g., credit card information, etc.) can be stored on the security device 103 and/or in a profile stored at the computing environment 203 or mobile device 206.

The external system 259 can include a commerce service 263 configured to process requests and commands. In one example, the commerce service authenticates commands or requests associated with a POS device 161. In another example, the commerce service 263 receives requests to generate orders for products and/or services, such as food items at a restaurant or a car wash service. In response to receiving requests or commands, the commerce service 263 can authenticate the command or request based on user data 239 and/or other user data stored at the external system 259. In one example, the commerce service 263 requests user credentials from the computing environment 203 to verify an identity of a user account with which a command is associated. The commerce service 263 can receive readings, such as sensor readings from the sensor 218. In one example, the commerce service 263 receives location data from the sensor 218, and determines that the vehicle 106 is within a predetermined geofence associated with a business. In this example, in response to the determination, the commerce service 263 transmits one or more offers or other notifications (such as operating hours, navigation instructions, etc.) to the security device 103 or the mobile device 206. The monitor application 215 or security application 251 can process the offers or other notifications and cause the security device 103 to announce the offer as an audible alert.

Figure 3:
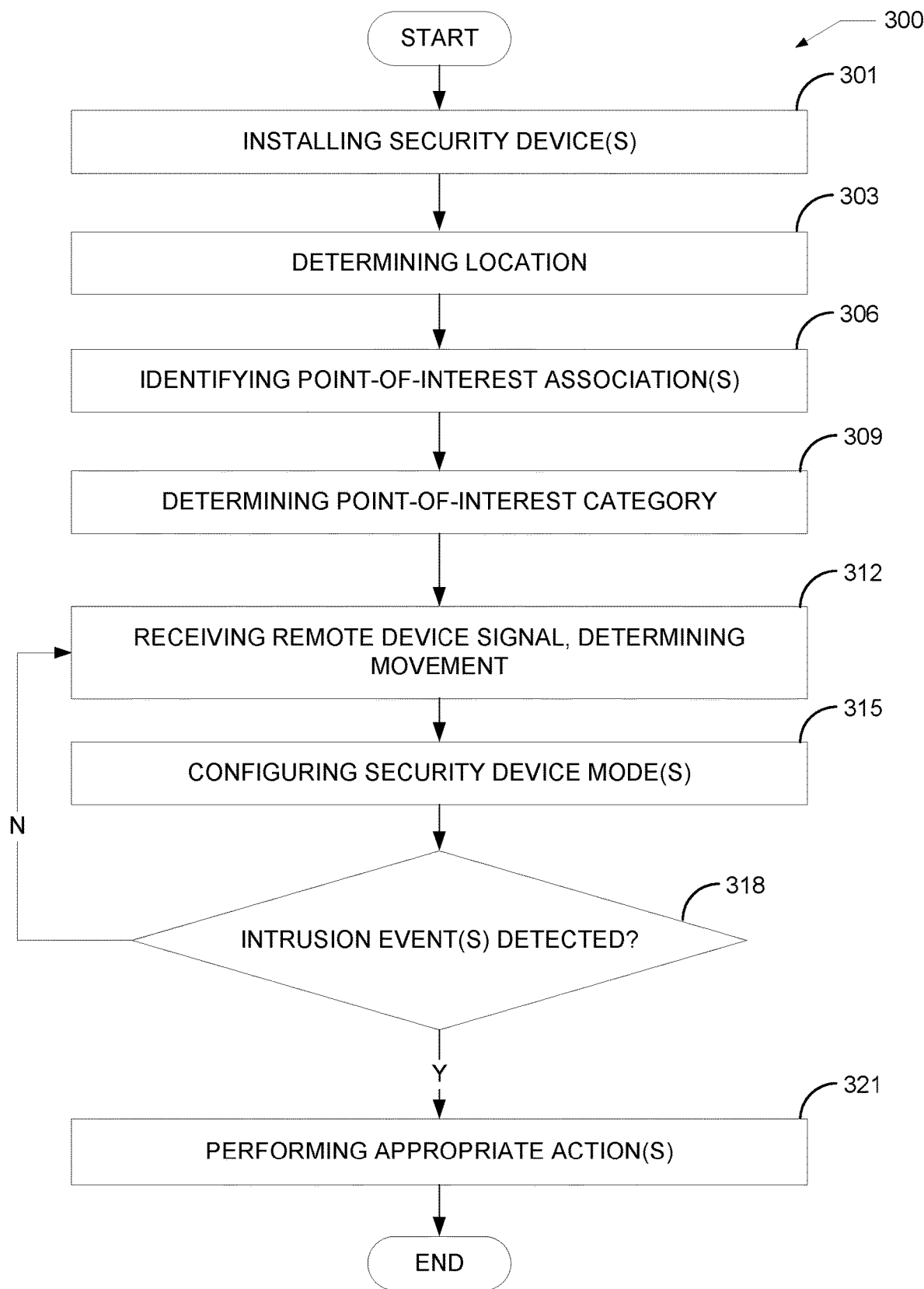
FIG. 3 is a flowchart of an exemplary process according to one embodiment of the present disclosure.

Referring now to FIG. 3 illustrated is a flowchart of a point-of-interest (POI)-based vehicle monitoring process 300. As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown.

In various embodiments, the process 300 demonstrates exemplary operations that may be performed by the present security system to determine the location of a security device, vehicle, remote device, and/or mobile device and perform appropriate anti-theft operations based on the location. Terms used in the subsequent description of FIGS. 3 and 4 can correspond to similarly named elements shown in FIG. 2 and described herein. For example, the terms "security device" correspond to security device 103 (see FIGS. 1A-C, 2) and "computing environment" or "remote computing environment" can correspond to computing environment 203 (see FIG. 2).

At step 301, the process 300 includes installing one or more security devices in a subject's vehicle. Installation of the security device can be perform according to one or more embodiments shown and described in the incorporated references. Installing the security device can include securing the security device to an interior or exterior portion of the vehicle. The security device can secure to the vehicle via a locking mechanism and/or other methods including but not limited to adhesives, fasteners, magnets, press fittings, snap fittings, and brackets. In one example, the security device secures into a cup holder, glove compartment, trunk, center console, side pocket, or other receptacle of the vehicle. In another example, the security device secures to a window or windshield of the vehicle. In another example, the security device secures to a dashboard of the vehicle. Installing the security device can include activating the security device via physical input, via a command from the subject's mobile device, and/or by connecting the security device to a power source.

Installing the security device can include securing one or more sensors to the vehicle, the subject's mobile device, or a remote device, such as a key fob. For example, an accelerometer or other motion sensor is secured to a gas cap of the vehicle. In another example, a camera sensor or PIR sensor is secured to the side mirror of the vehicle. In another example, an accelerometer is affixed to the remote device.

Installing the security device can include pairing the security device with a navigation and/or entertainment system of the vehicle, the mobile device, and/or the remote device. The monitor application can pair the security device by downloading one or more device profiles and adjusting settings of the security device and/or sensors based on the device profile. Non-limiting examples of device profiles include mobile device profiles, remote device profiles, sensor profiles, and profiles associated with the make or model of the vehicle.

Installing the security device can include registering the subject. Registering the subject can include generating or retrieving a user account for the subject and associating the user account with the security device. The monitor application can register the subject by emitting audible registration commands to the subject and by receiving and processing vocal responses from the subject. Registering the subject can include downloading the security application to the mobile device. The security application can register the subject by receiving user inputs and generating a user profile based on the user inputs. For example, the security application receives contact information, a username, a password, and a facial image of the subject, and registers the subject by transmitting the received data to the remote computing environment.

At step 303, the process 300 includes determining a current location of the security device and/or a vehicle, remote device, and/or mobile device associated therewith. Determining the current location of the security device can include receiving location data from positional circuitry of the security device, the vehicle, or the mobile computing device. In one example, a monitor application of the security device receives and processes location data from the positional circuitry. In another example, the monitor application receives location data from a GPS system of the vehicle. In a particular example, the vehicle 106 can include an internal cabin monitor that records location data. Continuing this example, the security device can connect to the internal cabin monitor to determine the exact and/or approximate location of the vehicle. In another example, the monitor application receives location data from a navigation application of the mobile device or via inputs to a security application running on the mobile device.

The security device can receive location data from a second security device installed in the vehicle or within a predetermined range thereof. In some embodiments, the monitor application stores the location data in storage of the security device and/or at a data store of a computing environment in communication with the security device.

At step 306, the process 300 includes identifying one or more points-of-interest (POIs) that correspond to the location determined at step 303. Identifying the POI can include, for example, performing a look-up process of one or more relational databases of POIs and their locations (e.g., POI data 247). For example, the monitor application computes a distance between the location of step 303 and the location of each POI. Continuing the example, the monitor application ranks the POIs by the computed distances and determines that a top-ranked POI is associated with the current location of the vehicle (or security device). In another example, the monitor application communicates with an external system to initiate a POI search around the location of step 303. Continuing this example, the monitor application receives a POI result from the external system and determines an association between the POI result and the location of step 303. In some embodiments, the monitor application causes the security application of a subject's mobile device to prompt the subject to confirm an association between their current location and a POI result. In one example, the monitor application determines a top-ranked POI candidate and transmits the information to the security application. Continuing the example, the security application causes the mobile device to render a user interface including a field for confirming the POI result. In the same example, via the security application, the security device receives user input confirming the POI result and, in response, the monitor application generates an association between the POI result and the location of step 303.

At step 309, the process 300 includes determining a category with which the POI of step 306 is associated. Determining the category can include performing a look up process of relational POI databases and identifying one or more category entries that correspond to an entry for the POI of step 306. For example, the monitor application accesses a database entry for the POI of step 306 and identifies, in the same entry or an associated entry, a POI category of "gas station." In another example, the monitor application indexes a data store of historical POI's associated with the security device (or a user account associated therewith), determines that the POI of step 306 matches a historical POI entry, and retrieves, from the data store, a category associated with the matched entry. Determining the category can include performing one or more classification or topic modeling techniques and/or applying one or more categorization models or algorithms. For example, the monitor application transmits the POI to a computing environment and the computing environment generates or retrieves additional data associated with the POI (e.g., online descriptions, public record information, social media posts, etc.). Continuing the example, the computing environment executes a trained machine learning model to intake the POI of step 306 and additional data and generate, as output, one or more POI category predictions.

At step 312, the process 300 includes receiving signal from a remote device (for example, an electronic key fob) and, based on analysis of the signal, determining movement of a subject associated with the vehicle. In some embodiments, the remote device refers to a subject's mobile device, such as a smartphone. The security device can receive the signal from the remote device via communication between corresponding receivers. The signal can include data from sensors connected to the remote device, such as, for example, motion data from an accelerometer or location data from a positioning circuit. The monitor application can analyze the signal to determine one or more of signal intensity, signal frequency, current settings of the remote device, and power level of the remote device. For example, the monitor application can determine that the signal intensity and frequency are at high levels and the power level of the remote device is 75%. Continuing the example, based on the high intensity and frequency level, the monitor application determines that the transceiver of the remote device is configured to a high power mode.

Determining the movement of the subject can include analyzing the motion data. Analyzing the motion data can include identifying a pattern in the motion data and determining if the identified pattern meets one or more predetermined threshold patterns. The predetermined threshold patterns can refer to patterns of motion data that are associated with movement toward or away from an origin, movement styles (e.g., walking, jogging, running, etc.), and movement behaviors (e.g., trips, falls, limps, etc.). Analyzing the motion data can include comparing the signal and/or motion data of step 303 to a time series log of signal and/or sensor readings received from the remote device. In one example, the monitor application can compare the signal to the time series log of received signals and, based on the comparison, determine that the signal is decreasing over time (e.g., generally decreasing or decreasing at or below a threshold value). In this example, in response to the determination, the monitor application determines that the remote device, and thus the subject, is moving away from the vehicle.

Analyzing the motion data can refer to analyzing a plurality of signals received from the remote device over a particular interval. The monitor application can determine a received signal strength indicator (RSSI) value for each of the plurality of signals. The monitor application can perform a regression analysis on the RSSI values over the particular interval to generate a regression model. The monitor application can compute, from the regression model, a coefficient of correlation and/or a time-based coefficient. The monitor application can determine that the coefficient of correlation meets (or fails to meet) a predefined threshold. The monitor application can determine a positive or negative directionality of the time-based coefficient. In response to determining that the coefficient of correlation meets the predefined threshold and the time-based coefficient has negative directionality, the monitor application can determine that the remote device is moving away from the vehicle. In response to determining that the coefficient of correlation fails to meet the predefined threshold and/or the time-based coefficient has positive directionality, the monitor application can determine that the remote device is moving toward from the vehicle.

In at least one embodiment, analyzing the motion data includes receiving image data from a camera sensor of the security device and processing the image data to a) identify the subject in the image data, and b) determine if the subject is moving toward or away from the camera sensor.

At step 315, the process 300 includes configuring the security device to one or more modes based on the POI category determined at step 309 and/or the movement determined at step 312. For example, in response to determining the POI category is "gas station," and that the subject is moving away from the vehicle, the monitor application can transition the security device (and/or sensors in communication therewith) to an armed mode, a high power mode, and/or, a high sensitivity mode. In another example, in response to determining the POI category is "secure parking garage," the monitor application transitions the security device to an armed mode and a lower power mode. In another example, in response to determining the POI category is "residential garage," the monitor application transitions the security device to an unarmed mode. In another example, in response to determining the remote device is moving toward the vehicle and is within a predetermined proximity of the security device, the monitor application transitions the security device to an unarmed mode.

Configuring the security device mode can include modifying one or more settings of the security device or the remote device on the POI category determined at step 309 and/or the movement determined at step 312. The monitor application can retrieve a device profile associated with the POI category determined at step 309. The monitor application can modify one or more settings of the security device or the remote device based on the device profile. In one example, the monitor application downloads a device profile associated with a "gas station" POI category. Continuing the example, the monitor application transitions the security device to an armed mode by modifying security device settings based on the device profile. In this example, the monitor application causes the security device to monitor various statuses of the vehicle (e.g., fuel levels, fuel inlet, fuel cap, door locks, door manipulation, etc.), activate a camera sensor in a continuous capture mode, and activate a PIR sensor in a high sensitivity mode. In another example, the monitor application determines a POI category of "residential garage" and retrieves a corresponding device profile associated from storage of the security device or a data store of a remote computing environment. Continuing the example, based on the device profile, the monitor application causes the security device to configure sensors to a low power, low sensitivity mode.

At step 318, the process 300 includes determining that a potential intrusion event is occurring or has occurred. The monitor application can determine that one or more vehicles doors have been manipulated. The monitor application can determine that seat weight and/or seat position has changed from a prior or historical setting. For example, the monitor application compares a current seat weight to a historical average seat weight and determines that the current seat weight exceeding the average by a predetermined magnitude, thereby indicating an intrusion event is likely to have occurred. The monitor application can determine that one or more individuals have moved within a predetermined proximity of the vehicle. For example, the monitor application analyses PIR sensor and/or camera sensor readings and detects the signature of one or more individuals proximate the vehicle.

The monitor application can determine that manipulation of the vehicle's fuel cap, fuel inlet, or a fuel pump inserted into the fuel inlet has occurred. For example, the monitor application determines that a fuel pump has been removed from the vehicle and the vehicle's fuel level is less than full, thereby indicating a potential fuel-siphoning attempt. In another example, the monitor application determines that a pressure reading from one or more tires is beneath a predetermine level, thereby indicating a potential tire puncture event. In another example, the monitor application performs biometric image recognition on image data from a camera sensor and determines that a captured individual's biometric likeness fails to match a predefined biometric likeness of the vehicle owner. The monitor application can generate conditional determinations based on a combination of sensor readings. For example, the monitor application determines that the vehicle has experienced an ignition attempt while the current location of the owner's mobile device is beyond a predetermined range of the vehicle, thereby indicating a potential theft attempt. The monitor application can receive readings and/or determinations from additional security devices, the security application of the subject's mobile device, or the remote computing environment. For example, the monitor application receives, from a second security device or a remote computing environment, an indication that a nearby second vehicle is experiencing or has recently experienced an intrusion event. In this example, in response to the indication, the monitor application determines that an intrusion event is likely to occur and performs one or more appropriate actions (see step 321).

In response to determining that a potential intrusion event is occurring or has occurred, the process 300 may proceed to step 321. In response to determining that a potential intrusion event has not occurred, the process 300 may proceed to step 318.

At step 321, the process 300 includes performing one or more appropriate actions in response to determining that a potential intrusion event is occurring or has occurred. The one or more actions can include, but are not limited to, transmitting an alert or notification, storing sensor readings, retrieving and transmitting buffer data, serving data at a web page accessible via the security application of the subject's mobile device, analyzing the sensor readings to determine additional information associated with the potential intrusion event, and initiating an alarm at the security device. The monitor application can transmit an alert to the subject's mobile device, the remote device, the remote computing environment, or additional security devices. The alert can include, but is not limited to, internet messages, push notifications, electronic mail, text messages, and voice calls.

In one example, the monitor application receives, from a second security device or a remote computing environment, an indication that a nearby second vehicle is experiencing or has recently experienced an intrusion event. In this example, in response to the indication, the monitor application performs one or more actions, such as transmitting an alert to the subject's mobile device or adjusting sensor settings for increased power or sensitivity.

In another example, the monitor application transmits an alert to a local emergency service. In another example, the monitor application streams image data from a camera sensor to the remote computing environment. Continuing the example, the remote computing environment hosts a web page including a feed of the image data and a link to the web page is transmitted to the security application of the subject's mobile device.

In another example, the monitor application transmits sensor readings to the security application. Continuing the example, the security application generates a summary of the potential intrusion event and renders the summary on the display of the mobile device. The summary can include, but is not limited to, the determination from the analysis (e.g., the determination of step 318), the sensor readings, buffer data, a timestamp corresponding to the intrusion event, a location of the vehicle, and/or contact information for emergency services.

In some embodiments, the security application generates and causes the mobile device to render a user interface. The security application, via the user interface, can receive commands for actions to be performed in response to the intrusion event. The user interface can include selectable options for various actions, such as, for example, activating an audible alarm at the vehicle, ignoring the intrusion event, requesting a summary, contacting emergency services, and disabling the vehicle. In another example, the security application includes or is integrated with a location application, such as Waze™, Google Maps™, etc., and the user can view the current location of the security device in virtually real time.

Figure 4:
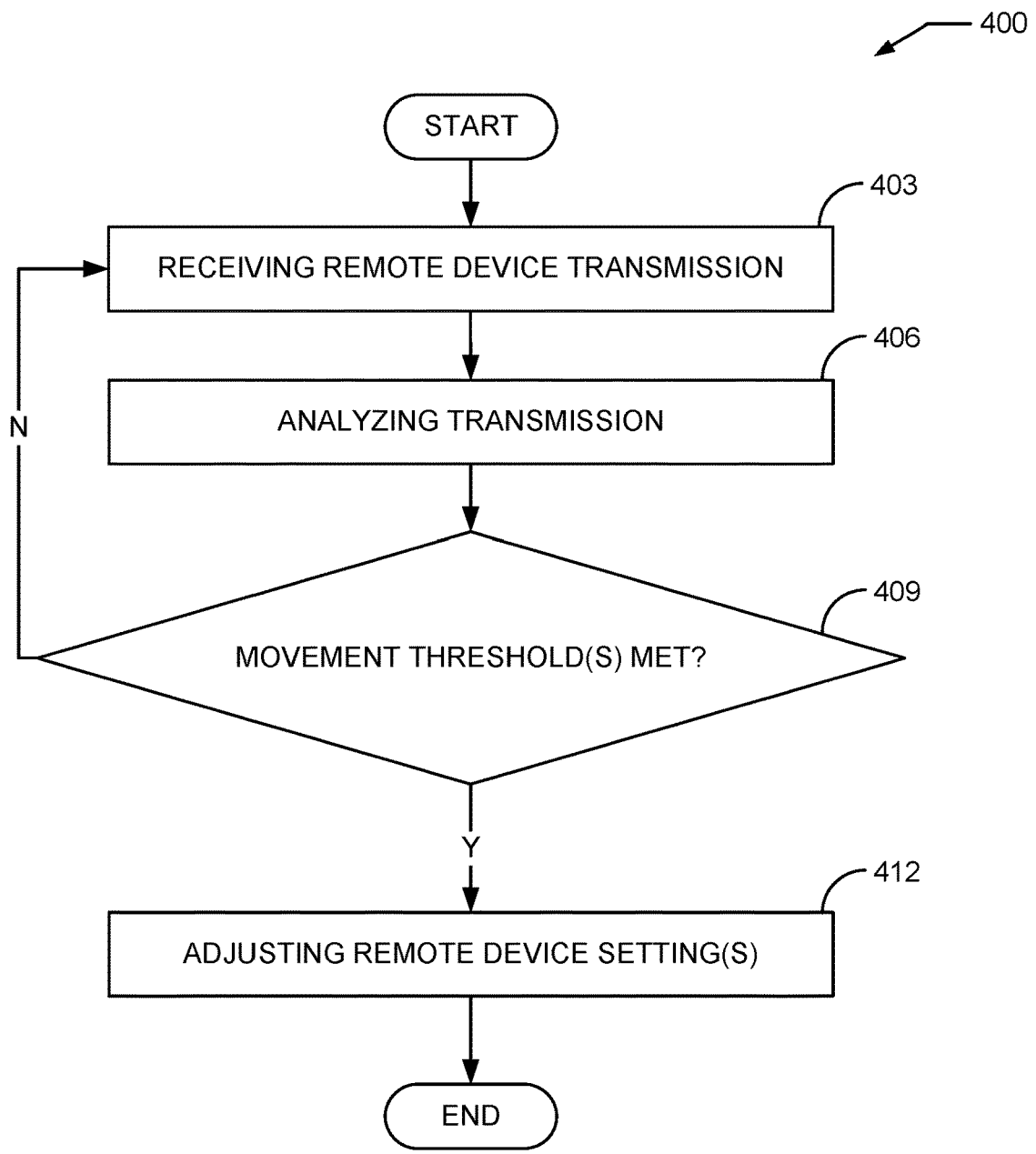
FIG. 4 is a flowchart of an exemplary point-of-interest (POI)-based vehicle monitoring process according to one embodiment of the present disclosure.

FIG. 4 shows an exemplary remote device control process 400. In various embodiments, the security device performs the process 400 to communicate with and adjust one or more settings of a remote device.

At step 403, the process 400 includes receiving one or more transmissions from a remote device. The security device can receive the transmission via communication between transceivers of the security device and the remote device. The transmission can include, but is not limited to, a remote device identifier, sensor data, current settings and/or battery power, and signal (e.g., from which values of frequency and received signal strength indicator (RSSI) can be determined). The monitor application can store the transmission in storage and/or at a data store of a remote computing environment. In some embodiments, a subject's mobile device receives the transmission and the security application performs steps 406-412 described herein.

Receiving the transmission can include authenticating the remote device. The monitor application can authenticate the remote device based on the remote device identifier. For example, the monitor application performs a look-up process at one or more authenticated device databases to determine if the remote device identifier is linked to one or more of the security device, the vehicle into which the security device is installed, a mobile device associated with the security device, and a user account associated with the security device. In response to authenticating the remote device, the monitor application can proceed with analyzing transmission therefrom (see step 406). In in response to failing to authenticate the remote device, the monitor application can perform various actions, such as suspending the process 400, ignoring future transmissions from the remote device, and transmitting a notification to the mobile device that an unauthenticated remote device attempted to communicate with the security device.

At step 406, the process 400 includes analyzing the transmission of step 406. Analyzing the transmission can include, but is not limited to, analyzing sensor data, identifying patterns in sensor data, comparing sensor data patterns to predefined patterns, computing and/or modeling transmission properties (e.g., RSSI, frequency, etc.), and determining if transmission properties meet one or more thresholds. The monitor application can determine if an RSSI value meets a predetermined threshold. The monitor application can receive or retrieve a set of historical RSSI values from a particular period (e.g., including the interval in which the transmission of step 403 was received). The monitor application can perform a regression analysis on the new RSSI value and the set of historical RSSI values generate a regression model. The monitor application can evaluate the model to determine, for example, a coefficient of correlation and a time-based coefficient. The monitor application can determine whether the coefficient of correlation meets one or more predetermined thresholds. The monitor application can determine whether the time-based coefficient demonstrates positive or negative directionality.

The monitor application can analyze sensor data to determine movement of or at the remote device. The monitor application can analyze a time series log of motion data from an accelerometer to estimate the direction of movement of the remote device. The monitor application can perform one or more pattern recognition techniques, algorithms, and/or models to identify one or more patterns in the motion data. The monitor application can compare the identified pattern to one or more predefined patterns associated with known motion types (e.g., movement towards or away from a point, movement rates, etc.). The monitor application can match the identified pattern to the one or more predefined patterns based on the comparison. The monitor application can process location data to determine a location of the remote device. The monitor application can compare the location of the remote device to a current location of the security device, vehicle, or mobile device. Based on the comparison, the monitor application can determine if remote device has entered or exited a geozone around the location of the security device.

At step 409, the process 400 includes determining that one or more movement thresholds are met. The movement thresholds can refer to whether the remote device is demonstrating a particular type of motion, such as movement towards or away from the security device, movement towards or away from a subject's mobile device, or movement towards or away from a location. In response to determining that one or more movement thresholds are met, the process 400 can proceed to step 412. In response to determining that no movement thresholds are met, the process 400 can proceed to step 403.

The monitor application can confirm a threshold for movement away from the security device by determining that the regression model of transmission RSSI demonstrates a threshold-satisfying coefficient of correlation and a negative directionality. The monitor application can confirm a threshold for movement towards the security device by determining that the regression model of transmission RSSI demonstrates a threshold-satisfying coefficient of correlation and a positive directionality. The monitor application can confirm a threshold for movement away from the security device in response to determining a transmission signal strength is less than a predetermined threshold and/or demonstrates a decreasing trend when compared to recent historical signal strengths. The monitor application can confirm a threshold for movement toward the security device in response to determining that a pattern of motion data matches a predefined pattern for motion toward an origin point. The monitor application can confirm a threshold for movement away from the security device in response to determining that the location of the remote device is outside the geozone surrounding the security device. In some embodiments, at step 409, the monitor application determines whether a battery power threshold is met by comparing a received power level to a predetermined power threshold.

At step 412, the process 400 includes adjusting one or more settings of the remote device based on the analyses and determinations of steps 406-409. Adjusting the settings can include, but is not limited to, configuring to a particular mode (e.g., low/high power mode, low/high frequency mode, low/high sensitivity mode, etc.), disabling or enabling a sensor, adjusting transmission signal power, adjusting transmission signal frequency, and adjusting sensor power, sensitivity, and/or frequency. In one example, in response to confirming a threshold for movement away from the security device, the monitor application transitions the remote device to a low power mode and low sensitivity sensor mode. In another example, in response to confirming a threshold for movement toward the security device, the monitor application transitions the remote device to a high power mode and a high sensitivity sensor mode. In another example, in response to confirming a threshold for movement away from the security device, the monitor applications commands the remote device to deactivate an accelerometer and activate positioning circuitry (e.g., including causing the remote device to transmit location data from the positioning circuitry). In at least one embodiment, in response to determining that a battery level of the remote device is less than a predetermined threshold, the monitor application transitions the remote device to a low power mode. For example, the monitor application 215 can change the transmissions signals produced by the transceiver 221a and/or transceiver 221b if the battery level of the remote device 104 meets, exceeds, or is bellow a particular threshold.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A sensing device, comprising:
   an accelerometer;
   a transceiver; and
   a computing device comprising a processor and in communication with the accelerometer and the transceiver, the computing device being configured to:
   transmit a first plurality of signals at a first power level to a remote device;
   determine, via the accelerometer, a movement of the sensing device;
   in response to the movement, increase a power level for transmission from the first power level to a second power level; and
   transmit a second plurality of signals at the second power level to the remote device.

2. The sensing device of claim 1, wherein the computing device is further configured to:
   determine, via the transceiver, that the sensing device has not moved relative to the remote device for a predetermined time; and
   reduce the power level for transmission based on the sensing device not moving relative to the remote device.

3. The sensing device of claim 1, wherein determining that the sensing device has not moved is based on a signal strength of transmissions received by the transceiver.

4. The sensing device of claim 1, wherein the computing device is further configured to:
   determine, via the accelerometer, that sensing device has not moved for a predetermined time; and
   reduce the power level for transmission based on the sensing device not moving.

5. The sensing device of claim 1, wherein the computing device is further configured to:
   receive, from the remote device, a message comprising a third power level responsive to a signal strength of at least one signal of the plurality of second signals meeting or falling below a predetermined threshold value; and
   in response to the message, decrease the power level for transmission from the second power level to the third power level.

6. The sensing device of claim 5, wherein the third power level is based on the signal strength of the at least one signal.

7. The sensing device of claim 5, wherein the third power level is the same as the first power level.

8. The sensing device of claim 1, wherein the computing device is further configured to:
   receive, from the remote device, a message comprising a third power level responsive to a signal strength of at least one signal of the plurality of second signals meeting or exceeding a predetermined threshold value; and
   in response to the message, increase the power level for transmission from the second power level to the third power level.

9. The sensing device of claim 1, wherein the sensing device is a key FOB for a vehicle.

10. A method, comprising:
    transmitting, via a transceiver of a sensing device, a plurality of first signals at a first frequency to a remote device;
    determining, via an accelerometer of the sensing device, a movement of the sensing device; and
    in response to the movement of the sensing device, transmitting, via the transceiver of the sensing device, a plurality of second signals at a second frequency to the remote device.

11. The method of claim 10, further comprising determining that a person is moving away from a vehicle in response to the movement of the sensing device.

12. The method of claim 10, further comprising:
    receiving, via the plurality of first signals, a battery level of the remote device; and
    adjusting a value of the second frequency based on the battery level of the remote device.

13. A sensing device, comprising:
    at least one sensor;
    a transceiver; and
    a computing device comprising a processor and in communication with the at least one sensor and the transceiver, the computing device being configured to:
    receive a plurality of signals from a remote device over a period of time via the transceiver;
    determine a plurality of signal strength values individually associated with a respective one of the plurality of signals;
    determine that a subset of the plurality of signal strength values passes a predefined threshold value; and
    in response to determining that the subset of the plurality of signal strength values passed the predefined threshold value, send instructions to the remote device to cause the remote device to generate signals at a different power level.

14. The sensing device of claim 13, wherein the computing device is further configured to determine the different power level based on a battery level of the remote device.

15. The sensing device of claim 13, wherein the computing device is further configured to determine that an elapsed time that the subset of the plurality of signal strength values passed the predefined threshold value meets a time threshold, wherein the instructions are sent further in response to the elapsed time meeting the time threshold.

16. The sensing device of claim 13, wherein the computing device is further configured to:
    perform a regression analysis on the plurality of signal strength values over the period of time to generate a regression model;
    determine that a coefficient of correlation in the regression model meets a predefined correlation threshold;
    determine that a time-based coefficient in the regression model is negative; and
    determine that a person is moving away from a vehicle in response to the coefficient of correlation in the regression model meeting the predefined correlation threshold and the time-based coefficient in the regression model being negative, wherein the instructions are sent further in response to determining the person is moving away from the vehicle and the instructions cause the remote device to generate signals at an increased power level.

17. The sensing device of claim 13, wherein the computing device is further configured to:
  receive motion data associated with the remote device;
  determine that a pattern in the motion data meets one of a plurality of predetermined threshold patterns; and
  enter into an armed mode from an unarmed mode based on the pattern in the motion data meeting the one of the plurality of predetermined threshold patterns.

18. The sensing device of claim 13, wherein the computing device is further configured to:
  determine that the plurality of signals decrease to be at or below a threshold value; and
  determine that a person is moving away from a vehicle in response to the plurality of signals decreasing to be at or below the threshold value.

19. The sensing device of claim 13, wherein the plurality of signals comprise a plurality of measurements from at least one second sensor associated with the remote device.

20. The sensing device of claim 13, wherein individual ones of the plurality of signals comprise at least one respective data value for at least one respective data variable and the computing device is further configured to:
  determine that the at least one respective data value of the at least one respective data variable has not changed more than a threshold value amount over a particular time period; and
  in response to determining that the at least one respective data value has not changed more than the threshold value amount over the particular time period, send instructions to the remote device to decrease a frequency of transmission of future signals.

* * * * *